United States Patent
Kalkum et al.

(10) Patent No.: US 12,440,844 B2
(45) Date of Patent: Oct. 14, 2025

(54) LOOP-MEDIATED ISOTHERMAL AMPLIFICATION DEVICES AND SYSTEMS FOR DETECTING GENETIC MATERIAL

(71) Applicant: City of Hope, Duarte, CA (US)

(72) Inventors: Markus Kalkum, Duarte, CA (US); Daniel Roeth, Duarte, CA (US); Isaac Bishara, Duarte, CA (US); Miro Rusnak, Duarte, CA (US); Sanjeet Dadwal, Duarte, CA (US)

(73) Assignee: City of Hope, Duarte, CA (US)

( * ) Notice: Subject to any disclaimer, the term of this patent is extended or adjusted under 35 U.S.C. 154(b) by 917 days.

(21) Appl. No.: 17/559,706

(22) Filed: Dec. 22, 2021

(65) Prior Publication Data

US 2022/0193658 A1 Jun. 23, 2022

Related U.S. Application Data

(60) Provisional application No. 63/129,888, filed on Dec. 23, 2020.

(51) Int. Cl.
*B01L 3/00* (2006.01)
*C12Q 1/6806* (2018.01)
(Continued)

(52) U.S. Cl.
CPC ............ *B01L 3/508* (2013.01); *C12Q 1/6806* (2013.01); *G01K 3/005* (2013.01);
(Continued)

(58) Field of Classification Search
CPC ...... B01L 3/508; B01L 3/5085; B01L 3/5023; B01L 2200/10; B01L 2200/147;
(Continued)

(56) References Cited

U.S. PATENT DOCUMENTS 9,498,778 B2 * 11/2016 Corey ...................... B01L 7/52
10,177,354 B2 1/2019 Zanoni et al.

FOREIGN PATENT DOCUMENTS

KR 20110094362 A * 8/2011
WO WO-2014/089120 A1 6/2014
(Continued)

OTHER PUBLICATIONS

Bramley et al., Low-Cost Manually Assembled Open Source Reader for Isothermal Pathogen Detection from Saliva using RT-LAMP: SARS-CoV-2 Use Case; medRxiv, Oct. 2020, 1-30, https://doi.org/10.1101/2020.10.19.20215319 (Year: 2020).*
(Continued)

*Primary Examiner* — Robert T. Crow
*Assistant Examiner* — Allison E Schloop
(74) *Attorney, Agent, or Firm* — Mintz, Levin, Cohn, Ferris, Glovsky and Popeo, P.C.

(57) ABSTRACT

Provided are methods, devices, and systems for a loop-mediated isothermal amplification (LAMP) reactions for detecting the presence of genetic material. A LAMP device includes an enclosure having outer walls configured to define an internal space. The LAMP device also includes a tray assembly configured to support a reaction vessel configured for holding a sample for amplification. The LAMP device also includes a plurality of light emitters configured to illuminate the reaction vessel for exciting a fluorescence of the sample in the reaction vessel. The LAMP device also includes an imaging device configured to obtain an image of the sample for determining a quantity of the fluorescence in the sample. The LAMP device also includes a controller configured to regulate a temperature of the tray assembly and instruct the imaging device to obtain the image for determining the quantity of the fluorescence in the sample.

13 Claims, 23 Drawing Sheets

(51) Int. Cl.
 *G01K 3/00* (2006.01)
 *G01N 21/64* (2006.01)
 *G06V 10/56* (2022.01)
 *G06V 20/69* (2022.01)

(52) U.S. Cl.
 CPC ..... *G01N 21/6428* (2013.01); *G01N 21/6456* (2013.01); *G06V 10/56* (2022.01); *G06V 20/693* (2022.01); *B01L 2200/10* (2013.01); *B01L 2200/147* (2013.01); *B01L 2200/16* (2013.01); *B01L 2200/18* (2013.01); *B01L 2300/046* (2013.01); *B01L 2300/0681* (2013.01); *B01L 2300/1827* (2013.01); *G01N 2201/062* (2013.01)

(58) Field of Classification Search
 CPC ............ B01L 2200/16; B01L 2200/18; B01L 2300/046; B01L 2300/0681; B01L 2300/1827; B01L 1/52; B01L 7/52; B01L 9/523; G01N 21/6428; G01N 21/6456; G01N 21/0332; G01N 21/6452; G01N 2201/062; G06V 10/56; G06V 20/693; G06V 10/147; C12Q 1/6806; C12Q 1/6844; G01K 3/005; C12N 15/1017
 See application file for complete search history.

(56) References Cited

FOREIGN PATENT DOCUMENTS

WO  WO-2018217953 A1 * 11/2018 ............ B01L 3/5088
WO  WO-2022/140598 A1  6/2022

OTHER PUBLICATIONS

Ganguli et al., Rapid isothermal amplification and portable detection system for SARS-CoV-2, PNAS, Aug. 2020, 117, 22727-22735 (Year: 2020).*
Ferreira, ImageJ User Guide, ImageJ/Fiji 1.46, Oct. 2012 (Year: 2012).*
Bramley, J. et al. (Oct. 24, 2020). "Low-Cost Manually Assembled Open Source Reader for Isothermal Pathogen Detection from Saliva using RT-LAMP: SARS-CoV-2 Use Care," medRxiv, 30 pages.
Ferreira, T. et al. (Oct. 2, 2012). "ImageJ User Guide" User Guide IJ 1.46r, 4 pages.

Ganguli, J. et al. (Sep. 15, 2020, e-published Aug. 31, 2020). "Rapid isothermal amplification and portable detection system for SARS-CoV-2," *PNAS* 117(37):22727-22735.
International Search Report mailed on May 31, 2022, for PCT Application No. PCT/US2021/064945, filed Dec. 22, 2021, 4 pages.
Written Opinion mailed on May 31, 2022, for PCT Application No. PCT/US2021/064945, filed Dec. 22, 2021, 7 pages.
Azzi, L. et al. (Jul. 2020, e-published Apr. 14, 2020). "Saliva Is a Reliable Tool to Detect SARS-CoV-2," *J. Infect.* 81(1):E45-E50.
Boom, R.et al. (Mar. 1990). "Rapid and Simple Method for Purification of Nucleic Acids," *J. Clin. Microbiol.* 28(3):495-503.
Diaz-Arevalo, D. et al. (Aug. 22, 2012). "Protective Effector Cells of the Recombinant Asp F3 Anti-Aspergillosis Vaccine," *Front. Microbiol.* 3:299.
Diaz-Arevalo, D. et al. (2017). "CD4(+) T Cells Mediate Aspergillosis Vaccine Protection," *Methods Mol Biol* 1625:281-293.
Fujita-Yamaguchi, Y. et al. (Jan. 5, 2018, e-published Nov. 17, 2017). "Mass Spectrometric Revival of an L-Rhamnose- and d-Galactose-Specific Lectin from a Lost Strain of *Streptomyces*," *J Biol Chem* 293(1):368-378.
Gao, Y. et al. (2016). "Preparation and Application of Cationic Modified Cellulose Papermaking Additive," *International Journal of Polymer Science* vol. 2016, 8 pages.
Glushakova, L.G. et al. (Nov. 2018, e-published Aug. 9, 2018). "Optimization of Cationic (Q)-Paper for Detection of Arboviruses in Infected Mosquitoes," *J. Virol. Methods* 261:71-79.
Hoos, J. et al. (Apr. 2017, e-published Jan. 16, 2017). "Reverse-transcription loop-mediated isothermal amplification for rapid detection of respiratory syncytial virus directly from nasopharyngeal swabs," *J Virol Methods* 242:53-57.
Ito, J. I. et al. (Sep. 2006). "Vaccinations with Recombinant Variants of Fumigatus Allergen Asp f 3 Protect Mice against Invasive Aspergillosis." *Infect Immun* 74(9):5075-5084.
Nakauchi, M. et al. (Jul. 2019, e-published Feb. 22, 2019). "Development of Real-Time Fluorescent Reverse Transcription Loop-Mediated Isothermal Amplification Assays for Rhinovirus Detection," *J. Med. Virol.* 91(7):1232-1238.
Notomi, T. et al. (Jun. 15, 2000). "Loop-Mediated Isothermal Amplification of DNA," *Nucleic Acids Res.* 28(12):E63-E63.
To, K. K. et al. (Jul. 28, 2020). "Consistent Detection of 2019 Novel Coronavirus in Saliva," *Clin Infect Dis* 71(15):841-843.
Vogels C.B.F et al. (Mar. 12, 2021, e-published Dec. 26, 2020). SalivaDirect: Simple and Sensitive Molecular Diagnostic Test for SARS-CoV-2 Surveillance, *Med* 2:263-280.
Yang, F. et al. (2013). "Preparation of Cationic Waste Paper and Its Application in Poisonous Dye Removal," *Water Sci. Technol.* 67 (11):2560-2567.

* cited by examiner

LOOP-MEDIATED ISOTHERMAL AMPLIFICATION DEVICES AND SYSTEMS FOR DETECTING GENETIC MATERIAL

CROSS-REFERENCE TO RELATED APPLICATIONS

This application claims priority to U.S. Provisional Application No. 63/129,888, filed on Dec. 23, 2020, and titled "PORTABLE DEVICE FOR THE RAPID AND SENSITIVE DETECTION OF RESPIRATORY DISEASE VIRUSES," the entirety of each of which is incorporated by reference herein.

BACKGROUND

Health screening may be used on humans to detect the presence of infectious diseases. For example, taking a body temperature or collecting a questionnaire may help detect the presence of an infectious disease. A typical health screening may be sufficient when symptoms manifest themselves quickly. But some diseases, such as viral respiratory diseases, are difficult to detect as a significant amount of time may pass between the time of infection and the manifestation of symptoms. For example, COVID-19 is a viral respiratory illness that may take up to five days between the time of infection and the manifestation of symptoms.

More worrisome, infected persons may unknowingly infect other persons with who they come into contact before symptoms manifest themselves. For example, an infected person with COVID-19 may transmit the disease to others before showing symptoms. This is especially problematic as infected persons may attend large gatherings before they manifest symptoms, spreading the virus to large number of people. This delay in experience symptoms makes screening for viral diseases critical before symptoms show while in contact with other persons. Currently, health screenings that detect viral diseases before the onset of symptoms, such as COVID-19, are difficult to access and costly.

SUMMARY

Disclosed is a device configured to conduct loop-mediated isothermal amplification (LAMP) reactions for the rapid detection of genetic materials from pathogens. In particular, various aspects and embodiments of the disclosure provide a method for determining a pathogenic material is present in the sample based on a fluorescence signal. The various embodiments also disclose a system for isolating genomic RNA for amplification.

In one aspect, disclosed herein are devices configured to conduct loop-mediated isothermal amplification (LAMP) reactions for detecting the presence of genetic material. A LAMP device includes an enclosure having outer walls configured to define an internal space. The LAMP device also includes a tray assembly configured to support a reaction vessel configured for holding a sample for amplification. The LAMP device also includes a plurality of light emitters configured to illuminate the reaction vessel for exciting a fluorescence of the sample in the reaction vessel. The LAMP device also includes an imaging device configured to obtain an image of the sample for determining a quantity of the fluorescence in the sample. The LAMP device also includes a controller configured to regulate a temperature of the tray assembly and instruct the imaging device to obtain the image for determining the quantity of the fluorescence in the sample.

In some variations, the tray assembly includes a tapered hole configured to hold the reaction vessel and wherein the reaction vessel is positioned within the tapered hole. Additionally, the reaction vessel protrudes at least partially downward from the tray assembly and wherein the plurality of light emitters is positioned below the tray assembly oriented towards the reaction vessel. Further, the controller is configured to determine the quantity of the fluorescence of the sample by reading green pixels from the image of the sample obtained by the imaging device. Additionally, the imaging device is positioned below the tray assembly and oriented towards the reaction vessel, and wherein the imaging device includes a long pass filter and a Bayer filter.

In some variations, the imaging device is a CCD camera configured to obtain the image near a bottom region of the tray assembly and wherein the imaging device is configured to capture an intensity of green light channels via the long pass filter and the Bayer filter. Additionally, the controller is configured to perform operations comprising determining, based on a temperature reading of the tray assembly, that the temperature of the tray assembly does not satisfy a temperature threshold, and adjusting, in response to the tray assembly not satisfying the temperature threshold, the temperature of the tray assembly to satisfy the temperature threshold. Further, the reaction vessel is at least one of a plate, a tube, and a strip, and wherein the plurality of light emitters includes at least one blue light LED.

In some variations, the tray assembly includes a center plate interposed between a plurality of mica plates. Further, the plurality of mica plates includes a set of outermost mica plates relative to the center plate and a set of innermost mica plates relative to the center plate, and wherein the set of outermost mica plates have a width larger than the set of innermost mica plates. Additionally, the plurality of mica plates have brass connector lip for a slide-on power connector and wherein the center plate is a copper plate.

Further, the device further comprises a heater lid above the tray assembly and inside the enclosure, the heater lid configured to regulate the temperature at the tray assembly. In some variations, at least a first light emitter of the plurality of light emitters is positioned near a first side of the tray assembly and a second light emitter of the plurality of light emitters is positioned near a second side of the tray assembly. Additionally, the controller is further configured to perform operations comprising generating an instruction to the light emitters to illuminate thereby illuminating the reaction vessel and measure a fluorescence signal from the reaction vessel. In some variations, the controller is further configured to perform operations comprising measuring a fluorescence signal of the sample inside the reaction vessel, and determining, based on the fluorescence signal, that a pathogenic material is present in the sample.

In another aspect, disclosed herein are non-transitory computer-readable storage mediums comprising at least one program for execution by one or more processors of a first device. The at least one program includes instructions which, when executed by the one or more processors, cause the first device to perform obtaining a fluorescence signal emitted from a reaction vessel, the fluorescence signal created by illuminating, via a plurality of light emitters, a sample in the reaction vessel supported by a tray assembly inside an enclosure configured to isolate an internal space from light outside the enclosure. The instructions also cause the first device to perform determining, based on the fluorescence signal, that a pathogenic material is present in the sample.

In some variations, the fluorescence signal is obtained by capturing an image of the sample in the reaction vessel and wherein determining that the pathogenic material is present in the sample further comprises: extracting green pixels from the image, determining intensity values of the green pixels in the image, and determining, based on the intensity values of the green pixels in the image, that the pathogenic material is present in the sample.

In yet another aspect, disclosed herein are systems for isolating genomic RNA for amplification. The systems comprise a syringe, an adapter configured to a tip of the syringe, a plurality of discs including 3-epoxypropyltrimethylammonium chloride (EPTMAC)-modified cellulose for binding RNA, the plurality of discs being stacked onto each other and configured to be locked in place in the adapter. The liquid in the syringe is passed through the plurality of discs for isolating genomic RNA on the plurality of discs.

In some variations, the tip of the syringe is a Luer lock and wherein the EPTMAC-modified cellulose is positively charged. Additionally, the adapter includes a larger opening configured to interface with the syringe and a smaller opening configured to dispense liquid, and wherein the plurality of discs is configured to be inserted at the larger opening.

The foregoing summary is illustrative only and is not intended to be in any way limiting. In addition to the illustrative embodiments and features described herein, further aspects, embodiments, objects, and features of the disclosure will become fully apparent from the drawings and the detailed description and the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Figure 1A:
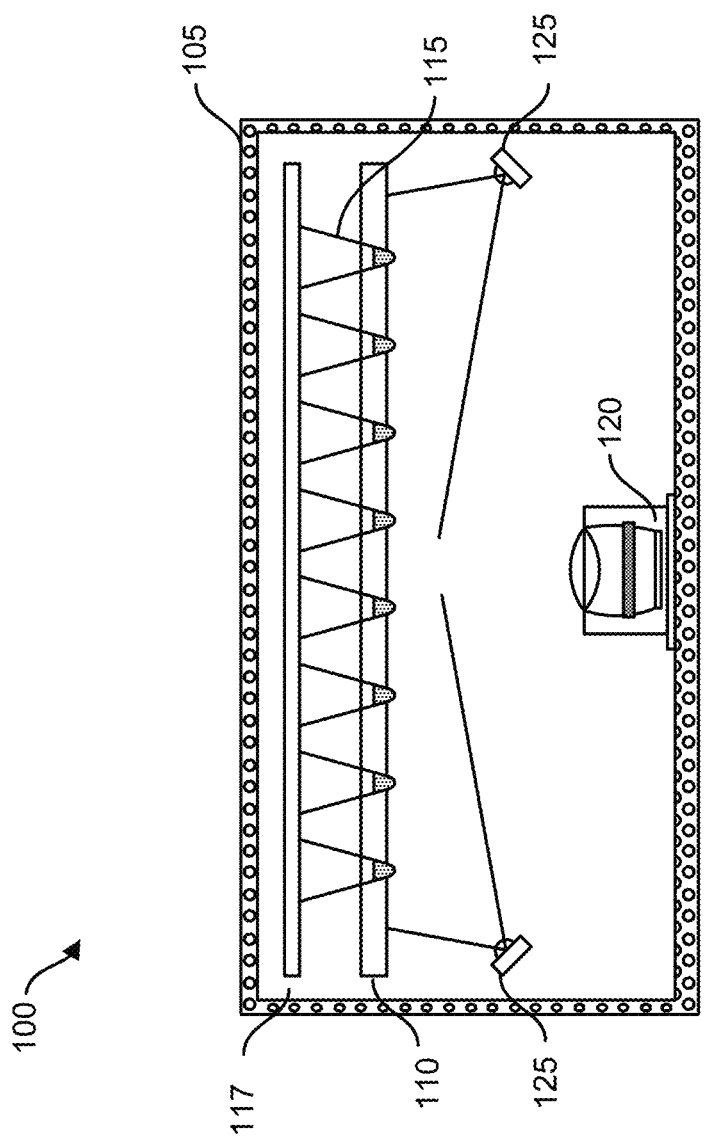
FIG. 1A shows an example of a LAMP device configured to support a tray assembly configured to support a reaction vessel for amplification.

The accompanying drawings, which are incorporated in and constitute a part of this specification, show certain aspects of the subject matter disclosed herein and, together with the description, help explain some of the principles associated with the disclosed implementations as provided below.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In some aspects and/or embodiments, systems, methods, and computer program products described herein include and/or implement a loop-mediated isothermal amplification (LAMP) reactions for detecting the presence of genetic material. More specifically, LAMP reactions may be used to amplify and detect mRNA and nucleic acid sequences. The LAMP method has several technological advantages over the commonly used reverse transcription polymerase chain reaction (RT-PCR) method. For example, the RT-PCR method is time-consuming and requires significant optimization to detect mRNA. Unlike RT-PCR, the BST polymerase enzyme used in LAMP reactions may readily perform the reverse transcription (RT) step, eliminating the need for a separate RT step. Furthermore, unlike RT-PCR, the reaction may be carried out at a constant temperature of approximately 65° C. and no thermal cycling is required. Eliminating thermal cycling saves time and reduces the need for expensive thermal cycling equipment. As described, a thermostat-controlled heater may be sufficient.

Additionally, in some aspects and/or embodiments, systems, methods, and computer program products described herein include and/or implement measurements of amplified nucleic acid sequences, such as DNA. Multiple options may exist to measure nucleic acid amplifications of a LAMP reaction. For example, DNA amplification may be measured by the acidification of the LAMP buffer. Pyrophosphoric acid may cause the acidification of the LAMP buffer. Typically, the acidification of the LAMP buffer may be measured by using a colorimetric dye, such as phenyl red, to signal a change in pH. In another example, DNA-specific fluorescent dyes may be used to detect the generation of the complex amplified DNA product. Dying the complex amplified DNA product with DNA-specific fluorescent dyes may cause the complex amplified DNA product to emit a fluorescent signal to reveal the presence of the amplified DNA product. This fluorescent signal may be detected faster than a pH change caused by the acidification. Unlike the pH change method, the DNA-specific fluorescent dyes may not be biased by potential interfering substances that could impact the acidity of the LAMP buffer.

At the design stage, LAMP primers may be designed for the nucleic acid amplification of the SARS-CoV-2 genome. The LAMP primers may be configured to amplify three target regions within the SARS-CoV-2 genome: ORF1ab, the spike protein gene, and the nucleocapsid gene. The target regions may be optimized in silico to have minimal overlap with human sequences and to be highly specific for SARS-CoV-2 and not for other human coronaviruses such as SARS-CoV, MERS, HCoV-HKU1, HCoV-NL63, and HCoV-OC43. Potential interfering properties such as hairpin, homodimer, and heterodimer formation were also avoided during the design stage. After preliminary tests on a small sample set, a clinical study utilized three primer sets: ORF2, S13, and N17. These three LAMP primer sets may be tested against RNA extracted from a panel of 22 common respiratory pathogens to verify their analytical specificity and diagnostic potential for COVID-19. The three LAMP primer sets yielded positive amplification signals only with a SARS-CoV-2 sample.

A portable LAMP device may conduct and analyze LAMP reactions to detect the SARS-CoV-2 coronavirus. In some embodiments, the LAMP device may be a portable box that requires a connection to a regular household power plug (e.g., 120 V). The LAMP device setup and operation may be controlled from a computing device (e.g., iPhone or a laptop) via a Wi-Fi connection. Additionally, the controller of the LAMP device may be configured to receive instructions from the external computing device (e.g., iPhone or a laptop) via a Wi-Fi connection. A software program on the external computing device may be configured to control sample setup and visualize the LAMP device results in real-time.

The methods, systems, and apparatuses described herein are for detecting the presence of specific nucleic acid sequences in a LAMP device. Additionally, the various embodiments disclose a method for determining a pathogenic material is present in the sample based on a fluorescence signal. The various embodiments also disclose a system for isolating genomic RNA for amplification.

FIG. 1A shows an example of a LAMP device 100 configured to support a tray assembly configured to support a reaction vessel 115 for amplification. The LAMP device 100 may be configured to conduct and analyze LAMP reactions. The LAMP device 100 may be configured to detect a fluorescence signal indicative of the presence of a genetic material.

The LAMP device 100 may be housed inside an enclosure 105. The enclosure 105 may contain a tray assembly 110 situated within its internal space. The tray assembly 110 may be configured to support or otherwise be coupled to one or more reaction vessels 115. The tray assembly 110 may comprise a heating plate with one or more openings that may be configured to receive a respective reaction vessel. For example, the tray assembly 110 may support 96-well PCR plates or individual PCR tubes or strips. The tray assembly 110 may be coupled to an electronic thermometer sensor. The tray assembly 110 may be situated within the internal space of the enclosure 105. The tray assembly may be configured to support a reaction vessel 115 configured to support a sample for amplification. The tray assembly may include a tapered hole configured to hold the reaction vessel 115.

The reaction vessel 115 may include a vial, a transparent vessel, a PCR plate, a PCR tube, or a PCR strip. The reaction vessel 115 may be positioned within the tapered hole of the tray assembly 110. The reaction vessel 115 may extend to an upper end of the optional heated lid 117 and be configured to attach to at the upper end of the optional heated lid 117. The reaction vessel 115 may protrude at least partially downward from the tray assembly. A heater lid above the tray assembly may regulate the temperature of the reaction vessel 115. In some embodiments, the heater lid may be configured to regulate the temperature at the tray assembly inside the enclosure 105. As mentioned, the tray assembly 110 may include one or more openings that each receive a respective reaction vessel. Each opening may be a tapered hole or aperture that is configured to tightly or snugly receive the outer walls of an inserted reaction vessel. As shown in FIG. 1, a bottom region of each reaction vessel may protrude out of a bottom region of the tray. For example, the bottom region of a reaction vessel may protrude 0.5 mm out of the bottom surface of the bottom region of the tray.

A light emitter 125 may be situated inside the enclosure 105. The light emitter 125 may be configured to illuminate the bottom of the tray assembly from the sides or other positions. For example, the light emitter 125 may be located on the sides and each light emitter 125 may be a strip of blue light LEDs (e.g., 470 nm predominant wavelength). In another example, the light emitter 125 may be positioned below the tray assembly and oriented towards the reaction vessel 115. The light emitter 125 may be configured to illuminate the reaction vessel 115 for exciting a fluorescence of the sample in the reaction vessel 115. For example, two strips of blue light emitting LEDs may excite the DNA intercalating fluorophore used in the LAMP reaction. In some embodiments, a first light emitter of the plurality of light emitter may be positioned near a first side of the tray assembly and a second light emitter of the plurality of light emitters may be positioned near a second side of the tray assembly. The light emitter 125 may be communicatively coupled to the controller.

In an example embodiment, the light emitter 125 may include blue high flux LEDs configured to emit light a wavelength of 470 nm. In some embodiment, the blue high flux LEDs may be 3 mm in length and may be configured to have a 70-degree viewing angle. The blue light emitting LEDs of each strip may be connected in parallel and may be powered by the GPIO connectors. In some embodiments, the blue light emitting LEDs may be coupled to the GPIO connectors via a resistor. In some embodiments, the light emitter 125 may be heat glued to the walls of the enclosure 105 at an angle of ~45°. In some embodiments, the controller may be configured to turn off other LEDs on the raspberry pi board to eliminate any source of background light from the enclosure 105.

With reference still to FIG. 1A, the bottom of the enclosure 105 may contain an imaging device 120. The imaging device 120 may be configured to observe, image, or obtain an image at the tray assembly 110. The imaging device 120 may be configured to detect a fluorescence signal emitted from a reaction vessel 115 at the bottom region of the tray assembly. For example, a camera may be configured to detect a fluorescence signal from a sample within the reaction vessel 115 at a vantage point below the tray assembly 110. The imaging device 120 may be configured to obtain an image of the sample for determining a quantity of the fluorescence in the sample. The image may be analyzed to determine the quantity of fluorescence in the sample to determine whether a pathogenic material was detected. In some embodiments, the imaging device 120 may include an ultra-wide-angle lens or a fisheye lens to increase the angle of view of the imaging device 120. Additionally, the imaging device 120 may be equipped with a filter, such as a glass filter, a plastic long pass filter (550 nm cut on wavelength) or a Bayer filter 610. The Bayer filter 610 may include a color filter array for arranging RGB color filters on a square grid of photosensors. The Bayer filter 610 may be used to enhance the detection of certain colors from the fluorescent signal.

In an embodiment, the imaging device 120 may be a CCD camera. The CCD camera may include a 5 megapixel 1080p OV5647 sensor chip, a fish-eye objective (e.g. KEYESTUDIO B076MPL9P1), and a 550 nm cut on long pass filter (e.g. plastic foil or Newport 12.7 mm, FR-OG550). The imaging device 120 may connect to the controller via a ribbon cable. The imaging device 120 may be configured to capture an image that includes a raw data array containing intensities of the green light channels. The imaging device 120 may include a Bayer filter 610 for detecting the green color of the fluorescent signal.

With reference still to FIG. 1A, the LAMP device 100 may further include or be coupled to a computer comprising a controller configured to control one or more aspects of the device. The controller may be communicatively coupled to the tray assembly, the plurality of light emitters, and the imaging device 120. The controller may be configured to regulate a temperature of the tray assembly and instruct the imaging device 120 to obtain the image for determining the quantity of the fluorescence in the sample. The computer may include, for example, an inexpensive controller, such as a Raspberry Pi 4 Model B, equipped with a battery buffered real time clock module (e.g., Nikou, ds3231 chip).

In some embodiments, the controller may be configured to regulate a temperature of the tray assembly, such as to maintain constant 65° C. for LAMP. In some embodiments, the controller may determine that the temperature of the tray assembly does not satisfy a temperature threshold based on a temperature reading of the tray assembly. In response to the tray assembly not satisfying the temperature threshold, the controller may adjust the temperature of the tray assembly to satisfy the temperature threshold.

In some embodiments, the controller may be configured to generate an instruction to the light emitter to illuminate thereby illuminating the reaction vessel 115. The controller may be configured to measure a fluorescence signal from the reaction vessel 115. The controller may be configured to determine that a pathogenic material is present in the sample based on the fluorescence signal. The controller may be configured to detect the fluorescence in an image based on the number of pixels having a certain color. In some embodiments, the controller may be configured to determine the quantity of the fluorescence of the sample by reading green pixels from the image of the sample obtained by the imaging device 120.

With reference still to FIG. 1A, the controller may be configured to capture and analyze images and monitor the fluorescence signal of each tube in real time. The controller may be configured to control of the plurality of light emitters 125 to illuminate the bottom of the reaction vessels to excite the fluorescence. In some embodiments, the controller may be configured to provide communications to the outside computing device (e.g., mobile device, raspberry pi, and laptop) via a WIFI or Bluetooth. In some embodiments, the controller may be configured to process images of samples in real time during a LAMP reaction.

In some embodiments, the controller may be configured to obtain a fluorescence signal emitted from a reaction vessel 115. The fluorescence signal created by illuminating, via a plurality of light emitters, a sample in the reaction vessel 115 supported by a tray assembly inside an enclosure 105 configured to isolate an internal space from light outside the enclosure 105. The controller may determine that a pathogenic material is present in the sample based on the fluorescence signal. The controller may determine a pathogenic material is present in the sample by extracting green pixels from the image, determining intensity values of the green pixels in the image, and determine that the pathogenic material is present in the sample based on the intensity values of the green pixels in the image.

Figure 1B:
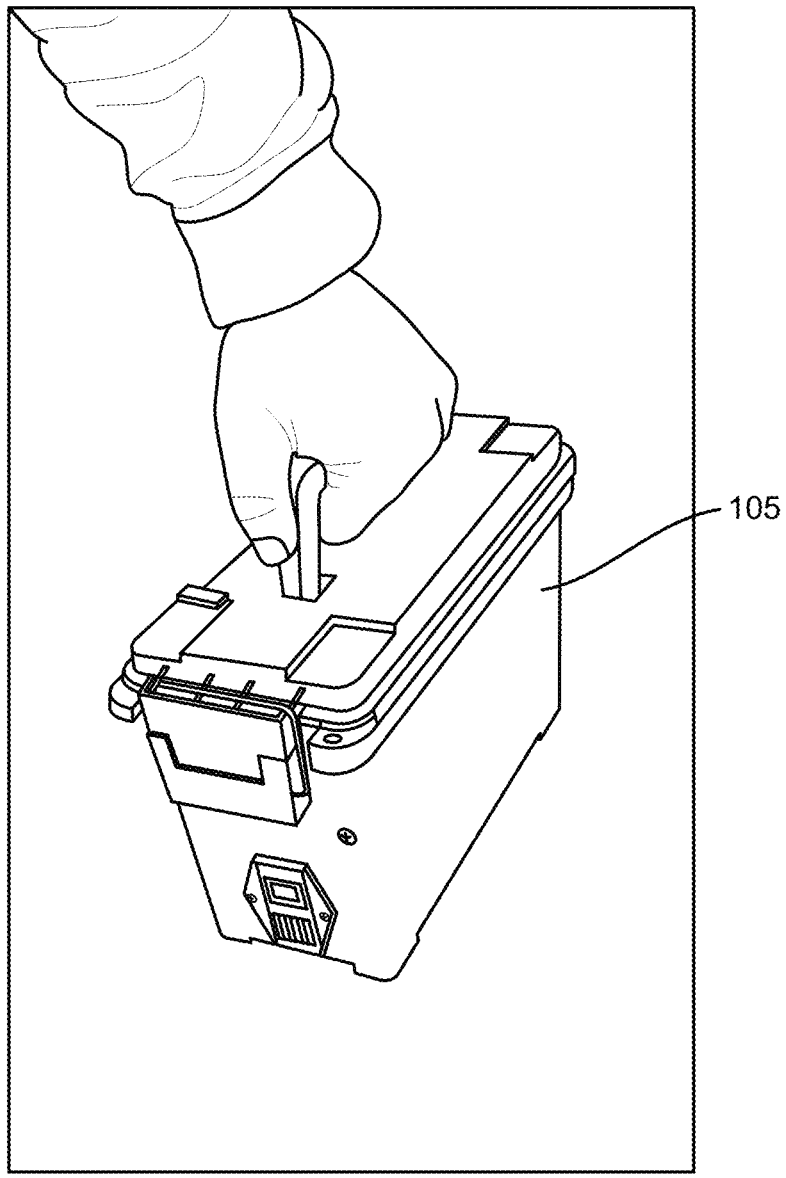
FIG. 1B shows an example of a LAMP device with an enclosure configured to prevent light from entering the disclosure and configured to support a tray assembly.

FIG. 1B shows an example of a LAMP device 100 with an enclosure 105 configured to prevent light from entering the disclosure and configured to support a tray assembly. The LAMP device 100 may be portable and may be configured to plug into a power outlet to power the device.

The enclosure 105 may be a light-tight enclosure 105 having a box or box-like structure. The enclosure 105 may have outer walls configured to define an internal space. The enclosure 105 may be configured to isolate the internal space from light outside the enclosure 105. The enclosure 105 may be formed of an outer frame that can have any of a variety of shapes. For example, the outer frame may be shaped to have a wide opening at the top that tapers towards the bottom of the enclosure 105. In another example, the surface of the top portion of the enclosure 105 may be larger than the bottom surface of the enclosure 105. The walls of the outer frame may extend inwardly as the wall extends towards the bottom surface of the enclosure 105. The enclosure 105 may define an enclosed interior space that is sealed from external light at least by outer frame of the enclosure 105.

The interior space may be accessed via a lid to the enclosure 105. For example, a lid may be placed at the top opening of the enclosure 105 to selectively couple to the enclosure 105. The lid may include an outer handle. The enclosure 105 may be configured to be moved using the handle. The enclosure 105 may be sized and shaped such that a human can hold the enclosure 105 with one hand. The enclosure 105 may include the components of the LAMP device 100. The components of the LAMP device 100 may be contained within or attached to the enclosure 105 including the controller and its power supply. The enclosure 105 may have an outside jack such as for a 120 V AC power cord. Its peak power use may be approximately 76 watts in an embodiment.

Figure 2:
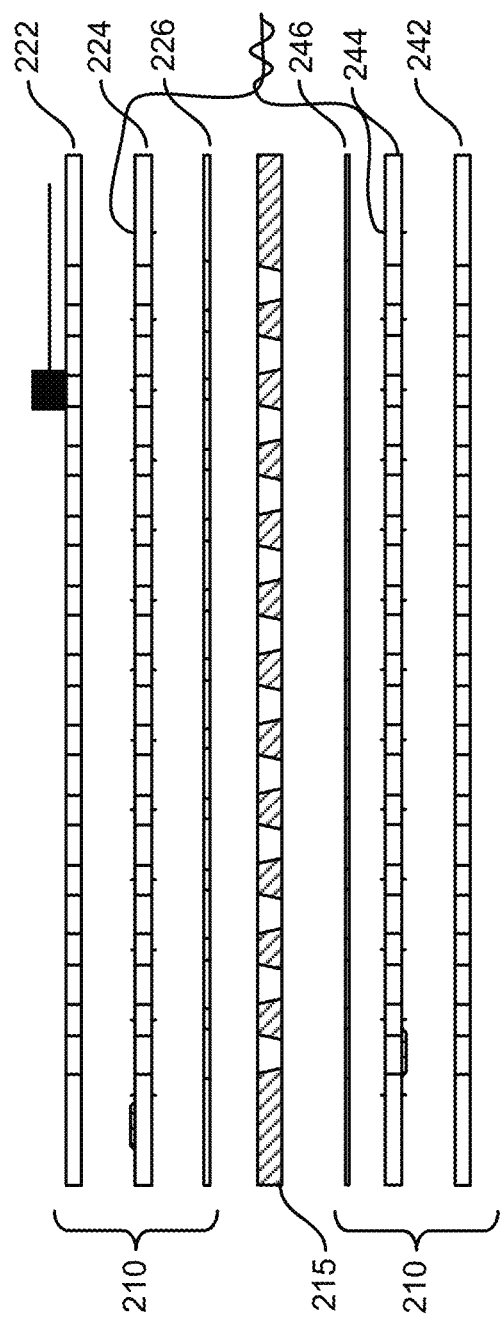
FIG. 2 shows an example of the tray assembly configured to heat including a center plate and a plurality of mica plate layers.

FIG. 2 shows an example of the tray assembly configured to heat including a center plate 215 and a plurality of mica plate layers. The tray assembly 110 may include a copper plate with tapered holes for receiving the reaction vessel 115. Mica plate layers 210 may be positioned on either side of the center plate 215 such that the mica plate layers 210 sandwich the copper plate therebetween. In some embodiments, each mica plate layer 210 may comprise three mica plates with each mica plate forming a mica plate layer. Additionally, and/or alternatively, the mica plate layers may include any number of mica plates. The mica plate layer may include several holes configured to co-axially align with the tray holes of the center plate 215. A first mica plate layer, a second mica plate layer, and a third mica plate layer may be configured to face the tray assembly 110. The copper plate may include mounting holes configured to mount the mica plates to the copper tray. The mica plate layers 210 may include a top outer mica plate 222, a bottom outer mica plate 242, a top middle mica plate 224, a bottom middle mica plate 244, a top inner mica plate 226, and a bottom inner mica plate 246.

The tray assembly may include a center plate 215 interposed between a plurality of mica plates. The plurality of mica plates may include a set of outermost mica plates relative to the center plate 215 and a set of innermost mica plates relative to the center plate 215. The set of outermost mica plates have a width larger than the set of innermost mica plates. The plurality of mica plates may have a brass connector lip for a slide-on power connector. The center plate 215 may be a copper plate for superior temperature control. In some embodiments, the copper plate may be 1/16" to 1/8" in thickness. The tray assembly 110 may be configured as a heater that includes a mica plate layer. The mica plate layer may include a set of electrically non-conductive mica plates and Nichrome 80 wire. The mica plates may be mounted on both sides (bottom and top sides) of the tray assembly 110. The tray assembly 110 and the mica plates may collectively form the heater.

Figure 3A:
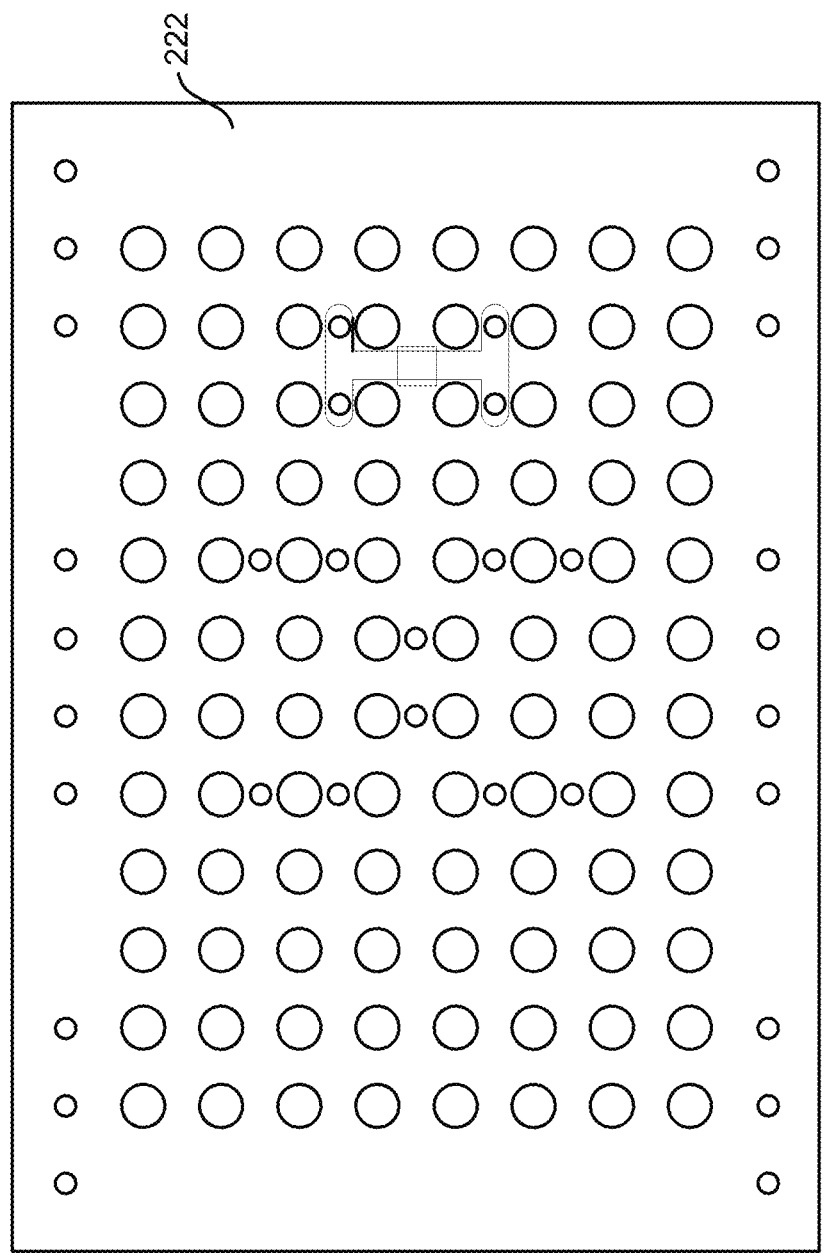
FIG. 3A shows an example of a top layer of a first layer of mica plates as the outermost mica plates relative to the center plate.

FIG. 3A shows an example of a top layer of a first layer of mica plates as the outermost mica plates relative to the center plate 215. The top layer of the first layer of mica plates may be the top outer mica plate 222. The mica plate layer may include several holes configured to co-axially align with the tray holes of the center plate 215.

Figure 3B:
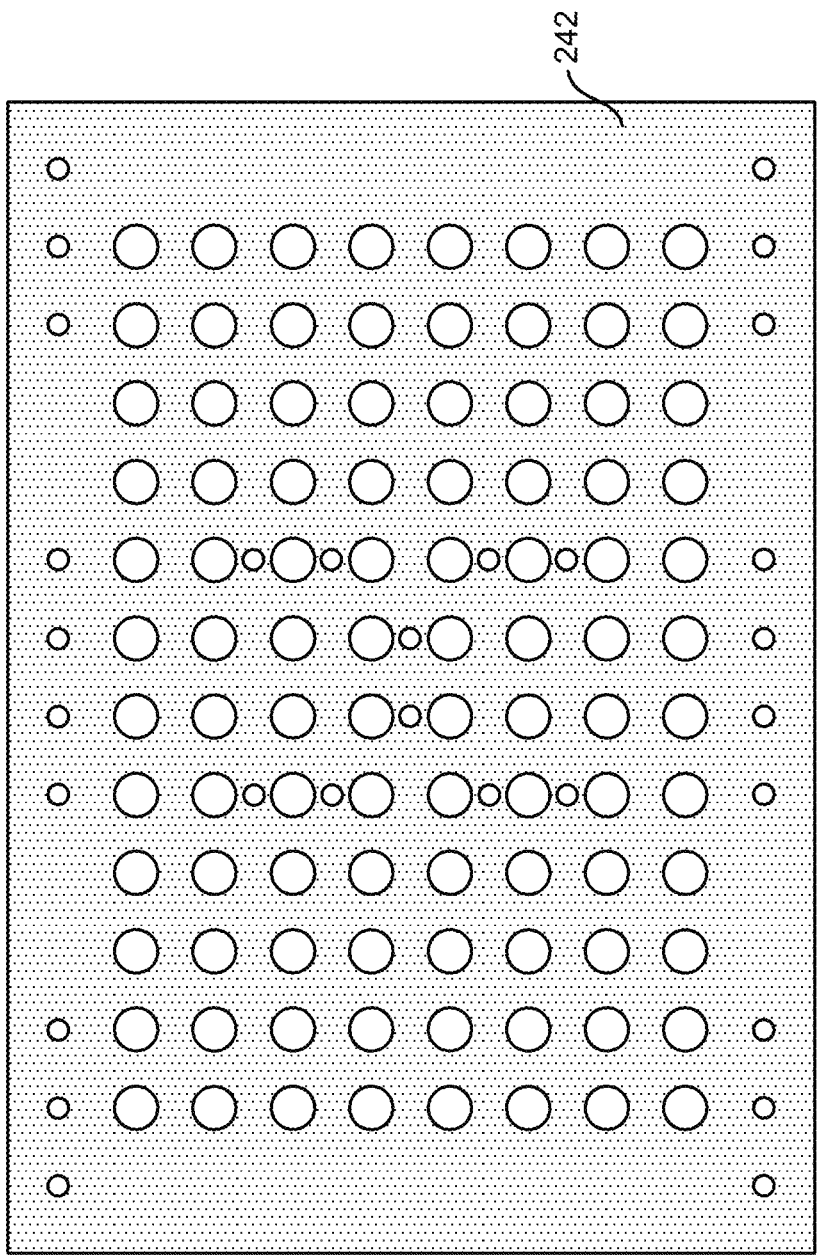
FIG. 3B shows an example of a bottom layer of a first layer of mica plates as the outermost mica plates relative to the center plate.

FIG. 3B shows an example of a bottom layer of a first layer of mica plates as the outermost mica plates relative to the center plate 215. The bottom layer of the first layer of mica plates may be the bottom outer mica plate 242. The top layer of the first layer of mica plates and the bottom layer of the first layer of mica plates may be positioned on either side of the center plate 215 such that the mica plate layers sandwiches the center plate 215 therebetween.

Figure 4A:
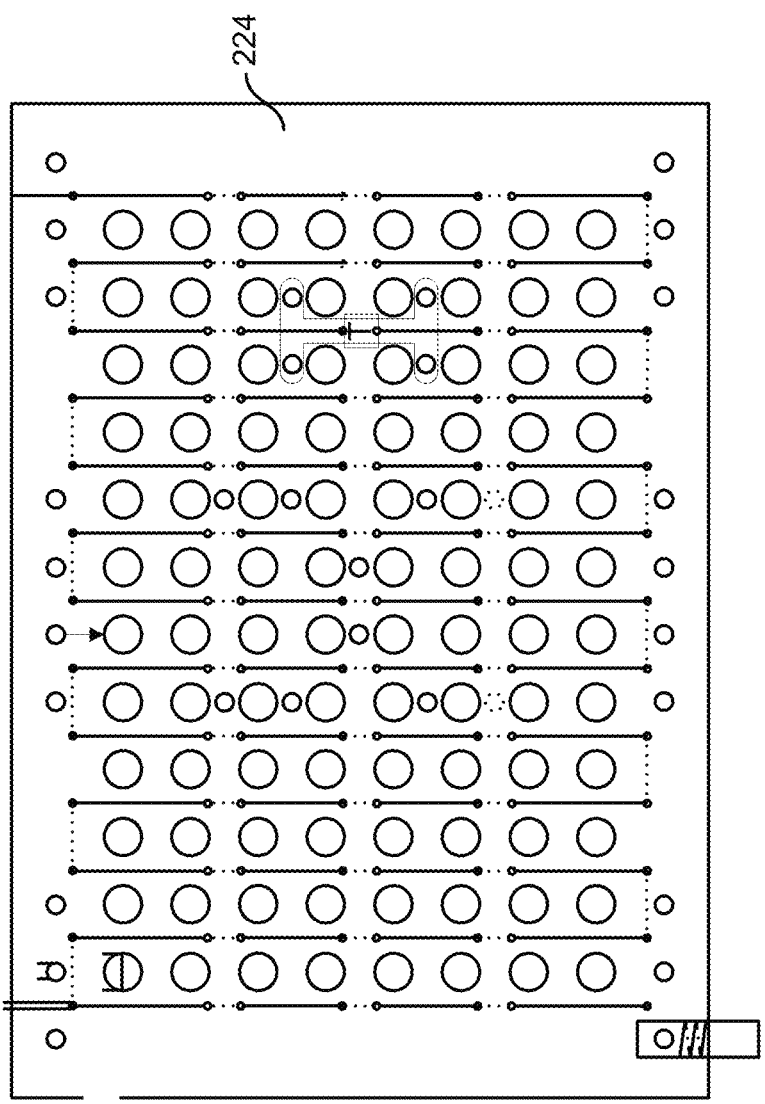
FIG. 4A shows an example of a top layer of a second layer of mica plates situated between a first layer of mica plates and a third layer of mica plates.

FIG. 4A shows an example of a top layer of a second layer of mica plates situated between a first layer of mica plates and a third layer of mica plates. The top layer of the second layer of mica plates may be the top middle mica plate 224. The mica plate layer may include several holes configured to co-axially align with the tray holes of the center plate 215. The second layer of mica plates may include a wire, such as a Nichrom 80 wire. The Nichrom 80 wire may span between a mica plate layer above tray assembly 110 and a mica plate layer below tray assembly 110. Additionally, the wire may be configured to span the rows of reaction vessel holes by spanning between the mica plate layer above tray assembly 110 and the mica plate layer below tray assembly 110. In some embodiments, two ends of the wire may be configured to connect the two mica plate layers closest to tray assembly 110.

In some embodiments, the wire may be configured to connect the mica plate layer immediately above the tray assembly 110. In some embodiments, the wire may be configured to connect the mica plate layer immediately below the mica plate layer. In some embodiments, two ends of the wire may be configured to connect the two innermost mica plate layers relative to the tray assembly 110. In some embodiments, the outermost mica plate layers may be thicker than the two innermost mica plate layers. For example, each outer and wire-carrying mica plate layers may have a thickness of 0.012' inches, while the innermost mica plate layer configured to contact the copper plate may have a thickness of 0.004' inches. The thickness of the copper plate may have a thickness configured to provide reasonably good heat conductivity.

The end of the mica plate layer may be configured to connect to Nichrome wires. The Nichrome wires of each end of the mica plate layers may have a brass connector lip for a slide-on power connector. For example, the Nichrome wires may be configured to receive a 0.187" slide-on power connector. The other end of each mica heater wire may connect directly to the Nichrome wire of the opposite plate. In an example, an overall resistance of the heater assembly is ~190Ω, limiting line current to 0.63 A, and therefore a maximum power usage of 75.8 W.

Figure 4B:
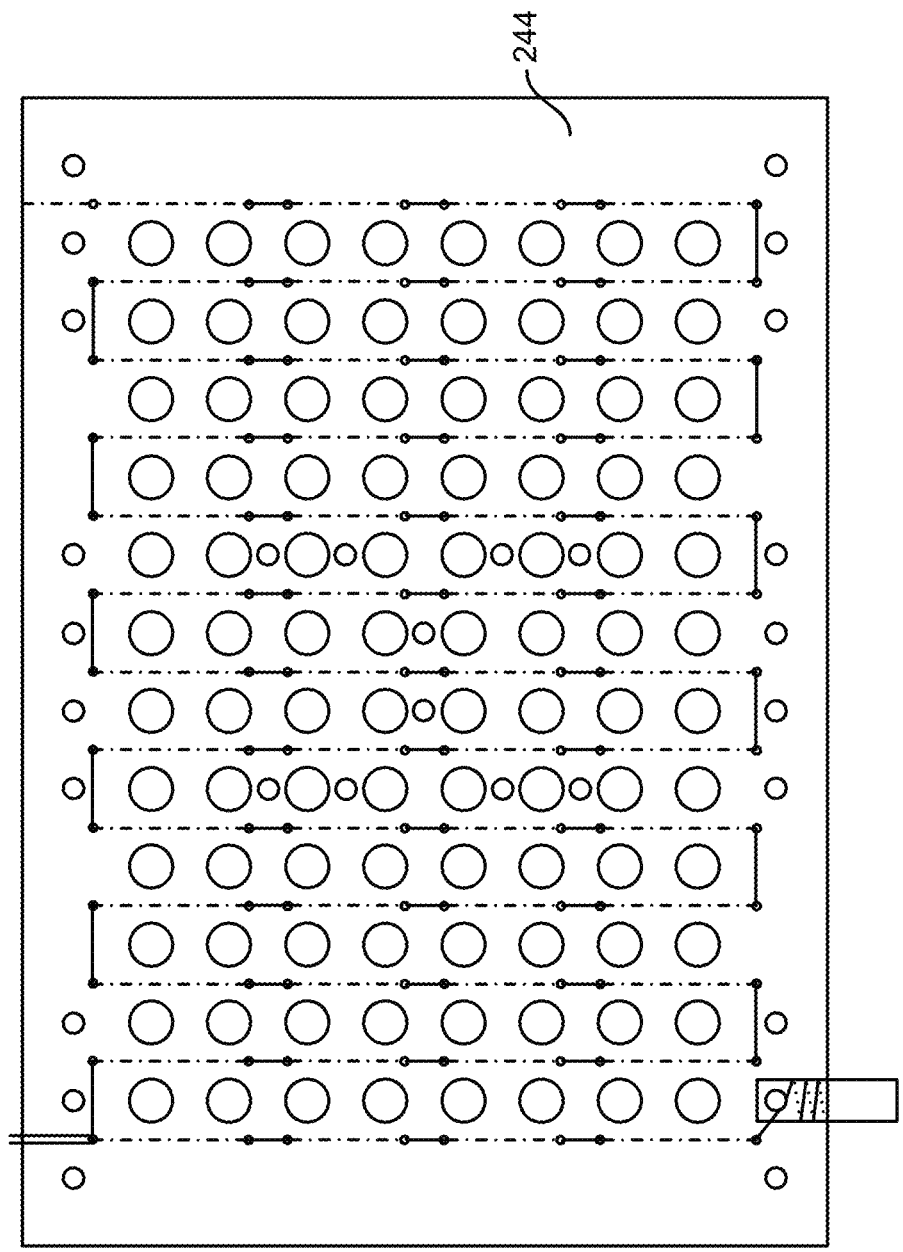
FIG. 4B shows an example of a bottom layer of a second layer of mica plates situated between a first layer of mica plates and a third layer of mica plates.

FIG. 4B shows an example of a bottom layer of a second layer of mica plates situated between a first layer of mica plates and a third layer of mica plates. The bottom layer of the second layer of mica plates may be the bottom middle mica plate 244. The top layer of the second layer of mica plates and the bottom layer of the second layer of mica plates may be positioned on either side of the center plate 215 such that the mica plate layers sandwiches the center plate 215 therebetween.

Figure 5A:
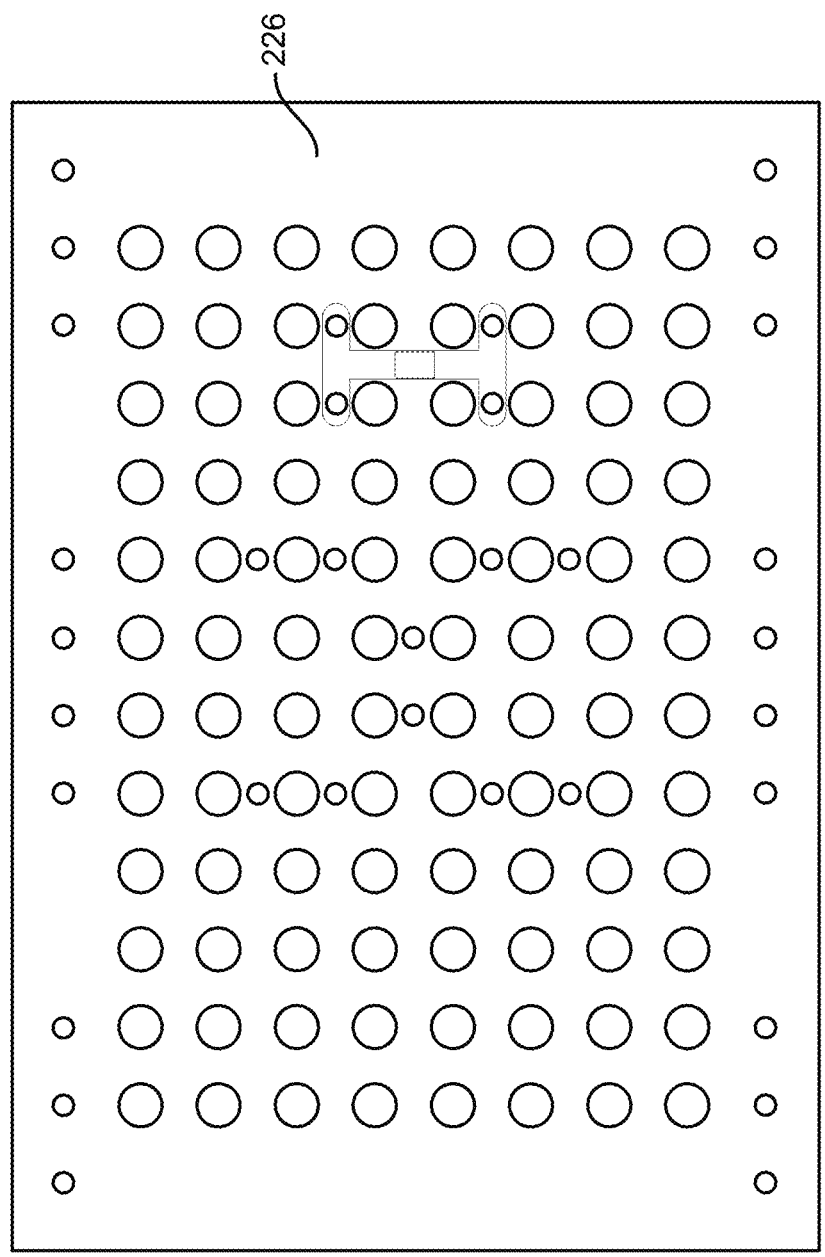
FIG. 5A shows an example of a top layer of a third layer of mica plates as the innermost mica plates relative to the center plate.

FIG. 5A shows an example of a top layer of a third layer of mica plates as the innermost mica plates relative to the center plate 215. The top layer of the inner layer of mica plates may be the top inner mica plate 226. The mica plate layer may include several holes configured to co-axially align with the tray holes of the center plate 215.

Figure 5B:
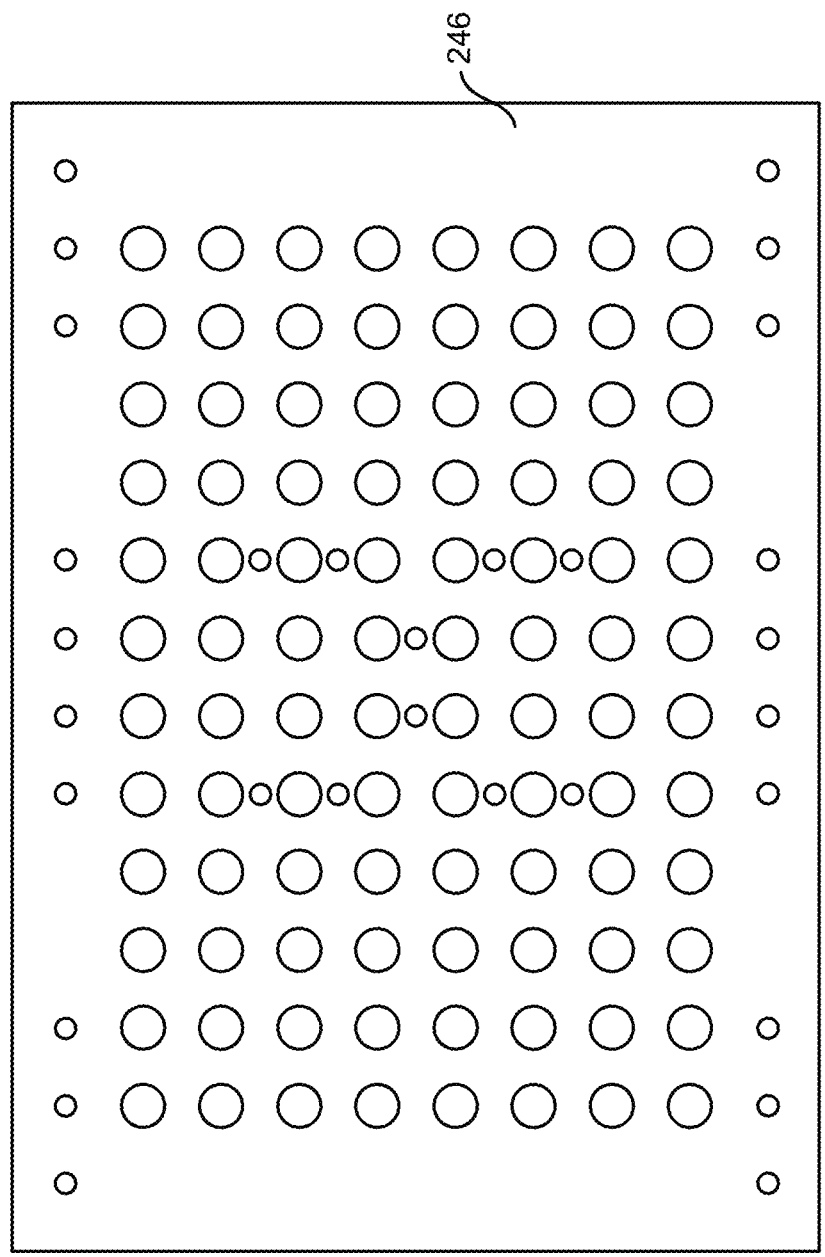
FIG. 5B shows an example of a bottom layer of a third layer of mica plates as the innermost mica plates relative to the center plate.

FIG. 5B shows an example of a bottom layer of a third layer of mica plates as the innermost mica plates relative to the center plate 215. The bottom layer of the inner layer of mica plates may be the bottom inner mica plate 246. The top layer of the third layer of mica plates and the bottom layer of the third layer of mica plates may be positioned on either side of the center plate 215 such that the mica plate layers sandwiches the center plate 215 therebetween.

In some embodiments, the mica heater tray assembly may be controlled by the controller (e.g., raspberry pi) through two GPIO pins. The computer may be configured to turn the line voltage on and off through a solid-state relay (e.g. Crydom MP120D3) connected in series via a 220Ω resistor to GIPI ports #37 (I/O) and #39 (ground). At the same time, the computer monitors the temperature of the heater through the digital thermometer sensor DS18B20 that connects to the GIPO pins #6 (ground), 11 (1-wire), and 17 (3.3V). A 4.7 kΩ resistor bridges pins #11 and #17 to pull-up the required operating voltage on the one-wire interface. The controller may be configured to control the heater power in accordance with the temperature reads.

Figure 6:
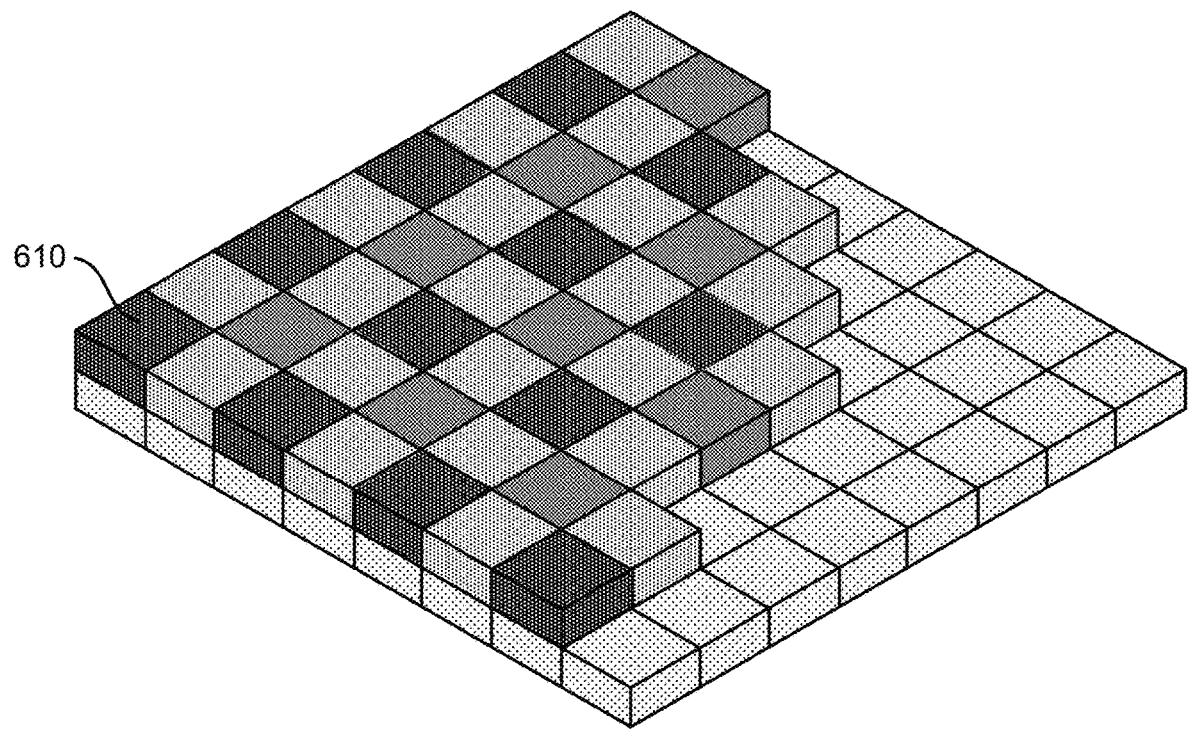
FIG. 6 shows an example of a Bayer filter.

FIG. 6 shows an example of a Bayer filter 610. A Bayer filter 610 may be a color filter array for arranging RGB color filters on a square grid of photosensors. The arrangement of color filters may be used to create a color image. The Bayer filter 610 may be found in most color CCD cameras and may include, for example, 50% green light filters on rows of pixels. The two alternating rows in the Bayer filter 610 may contain blue and green pixels or green and red pixels, in each alternating row. The controller may be configured to continuously read the green pixels of the CCD chip to quantify fluorescence in each LAMP reaction over the course of the reaction. The combination of the blue LEDs, the long pass filter, and the Bayer filter 610 of the CCD chip may regulate the fluorescence in the LAMP reaction tubes.

Figure 7:
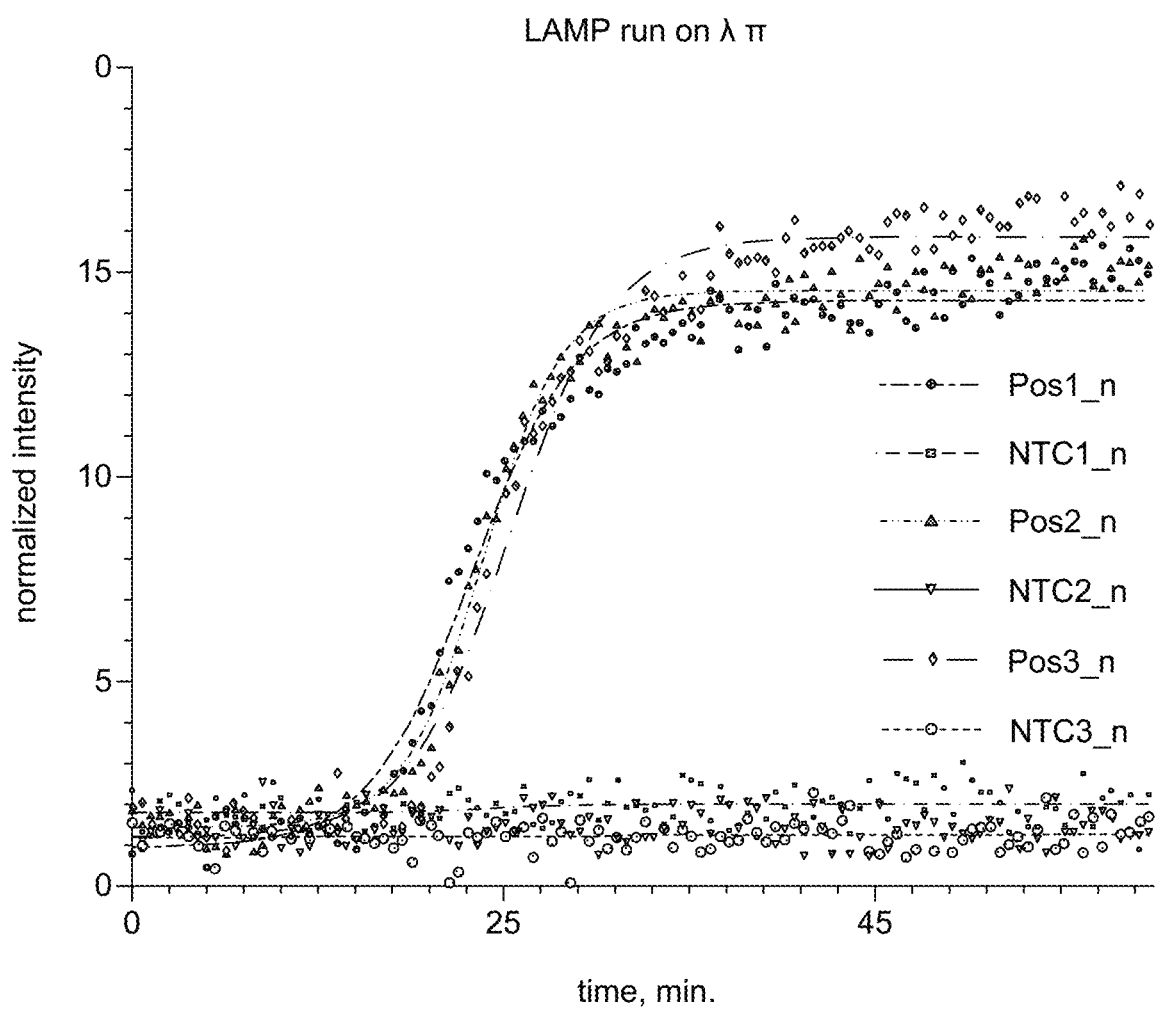
FIG. 7 shows an amplification curve based on the light intensity detected using the imaging device.

FIG. 7 shows an amplification curve based on the light intensity detected using the imaging device 120. The Bayer filter 610 of the device may detect the fluorescence signals emitted from the reaction vessel 115. The controller may measure the fluorescence signals emitted from the reaction vessel 115 via the Bayer filter 610. The resulting amplification curves may be indicative of positive samples. As shown in FIG. 7, three amplification curves may be indicative of coronavirus positive samples. No amplification curve may be indicative of a negative or control sample.

Figure 8:
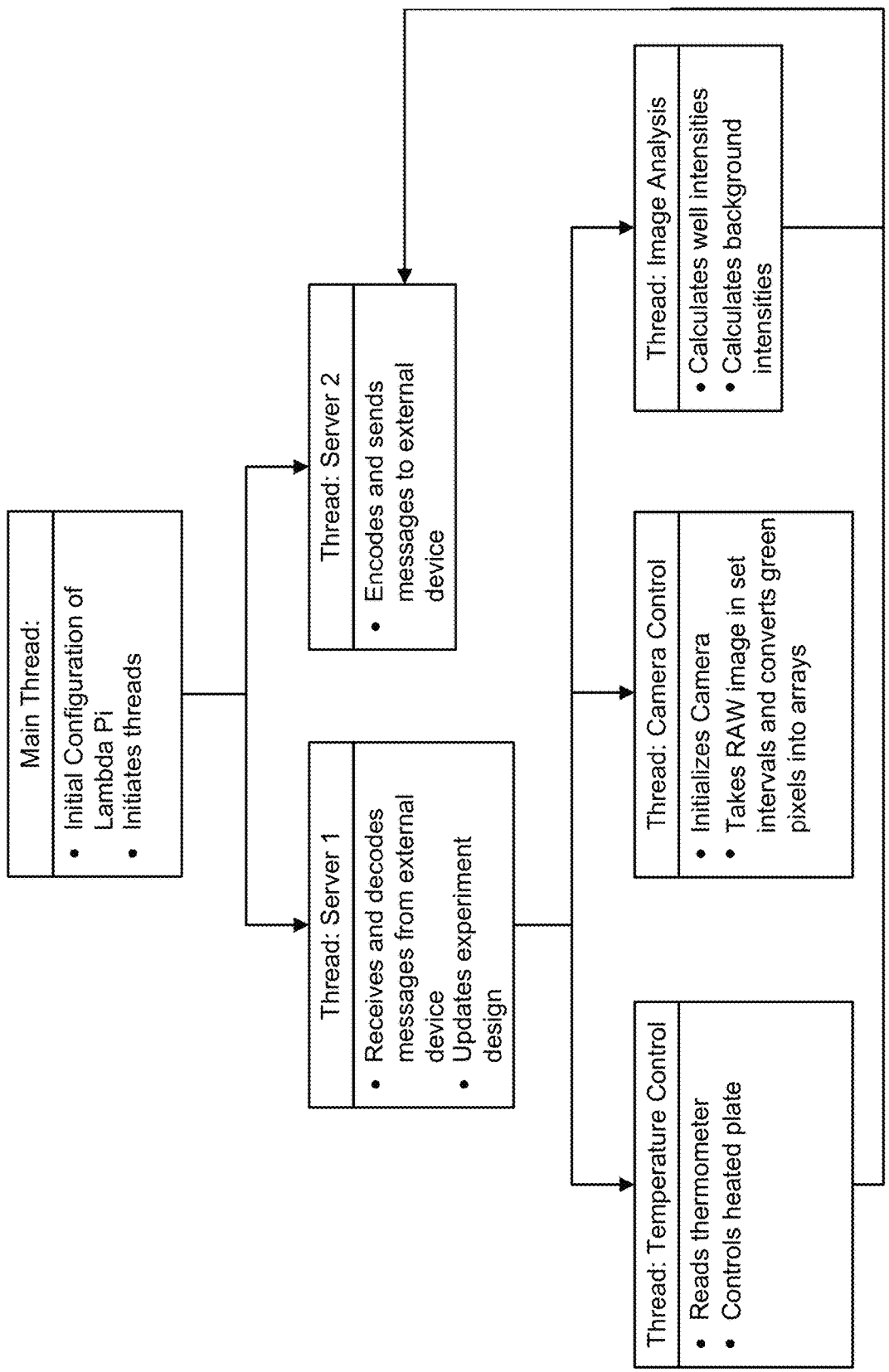
FIG. 8 shows an example of a software architecture for the controller.

FIG. 8 shows an example of a software architecture for the controller. The controller may be configured to run software having an architecture including a plurality of threads for enabling various functions of the components for the device. The threads may be configured to receive and process various communications from the components of the device. The plurality of threads may manage tasks such as temperature control, camera control, and image analysis. In some embodiments, the software architecture may include a queue for handling various event objects received from the device components. The event objects may enable streamlined communication between threads that allow data exchange and set flags for managing controller functionality.

The controller may be configured to monitor and regulate the temperature of the tray assembly. The software architecture of the controller may include a temperature control thread having a temperature control function. The temperature control thread may be initiated in response to receiving the information about the wells to measure. The controller may be configured to start the heat control module in response to receiving the information about the wells to measure. The controller may be configured to read the temperature of the mica plate layer via a digital thermometer (e.g., DS18B20). The controller may be configured to switch on and heat the tray assembly in response to the assay temperature falling below a predetermined threshold (e.g., 65° C.). For example, if the controller detects an assay or reaction vessel 115 temperature lower than 65° C., the controller may be configured to switch on and heat the tray assembly. In some embodiments, the controller may be configured to trigger a relay in response to the assay temperature falling below a predetermined threshold (e.g., 65° C.). In some embodiments, the controller may be configured to trigger a relay for a predetermined period of time based on the temperature of the tray assembly. For example, the controller may be configured to maintain the relay on for a longer period of time when the temperature of the tray assembly is more than 10 degrees cooler than the predetermined threshold. In another example, the controller may be configured to maintain the relay off for a longer period of time when the temperature of the tray assembly is less than 10 degrees cooler than the predetermined threshold. The time interval for which the relay is switched on may change dependent on the current mica plate layer temperature. Adjusting the time interval for which the relay is switched on may allow the tray assembly to be reached quickly and to maintain the plate temperature constant. Below is an example of time intervals for which the relay is switched on and off based on the temperature of the tray assembly:

| Temperature Range | Relay ON time* | Relay OFF time* |
|---|---|---|
| <55° C. | 4 s | 0.5 s |
| 55-63° C. | 0.8 s | 0.6 s |
| 63-65° C. | 0.5 s | 0.5 s |

*on and off times cycle between temperature reads

The controller may be configured to capture images of the reaction vessel 115 in the tray assembly via an imaging device 120. The software architecture of the controller may include a camera control thread having an image capturing function. The controller may be coupled to a camera. The controller may be configured to acquire images. The controller may be configured to activate the light emitter 125 prior to acquiring an image. The controller may be configured to maintain the light emitter 125 on for a predetermined period of time before acquiring an image. The controller may be configured to set the image capturing settings to optimize capturing the fluorescence. For example, the camera may be initialized for 4 seconds with a constant frame rate of 2 images per second and a shutter speed of 0.5 seconds. After initializing the camera, the controller may be configured to switch the automatic exposure mode and the automatic white balance modes to fixed values. The controller may be configured to capture an image every 15 seconds for the duration of the LAMP reaction. The controller may be configured to store the photos in JPG format. In some embodiments, the controller may be configured to store the photos in JPG format extended with raw values stored in the JPG metadata section. The controller or an external device may write the raw values from the JPG metadata section into a NumPy array. From this array, the green pixels may be extracted and the intensity values of two adjacent rows of pixels (e.g., the blue/green and the red/green rows) may be summed up. The resulting array may be sent via a queue object to the image processing step.

The controller or other external device may be configured to analyze image data to determine the intensity of the fluorescence signal. The controller or other external device may have a software architecture with an image analysis thread having an image analysis function. The controller or other external device may determine the intensity of the fluorescence signal based on the relative fluorescence units (RFU). To calculate the RFU for the reaction vessel 115, the image may be masked with individual circles around the center of each tube bottom. In some embodiments, the image data may include the intensity values of green pixels. Then, the controller or other external device may average the pixels values. To compensate for fluctuations in the camera acquisition, the background intensities in a ring around each sample tube may be calculated and subtracted from the sample RFU. The acquired values may be stored locally in a CSV file and also may be sent to an external device connected through WI-FI.

After the LAMP reaction has ended, the RFU data series may be fitted into a general sigmoid function. The fitting may to a general sigmoid function using the SciPy submodule Optimize. Initial values for the asymptotic values may be the minimum (b) and maximum RFU values (L). The initial estimate of the vertex time coordinate (tm) is derived from the half maximum RFU value. Initial values for k and T are set to 1. The fitting may occur using the expression below:

$$y = b + \frac{L}{(1 + Te^{-k(t-tm)})^{1/T}}$$

The fitted function may be used to calculate the threshold time (Tt), which is defined as the time point at which the fitted RFU is greater than the baseline and two standard deviations. Tt values are stored locally in a csv file and sent to an external device.

Figure 9A:
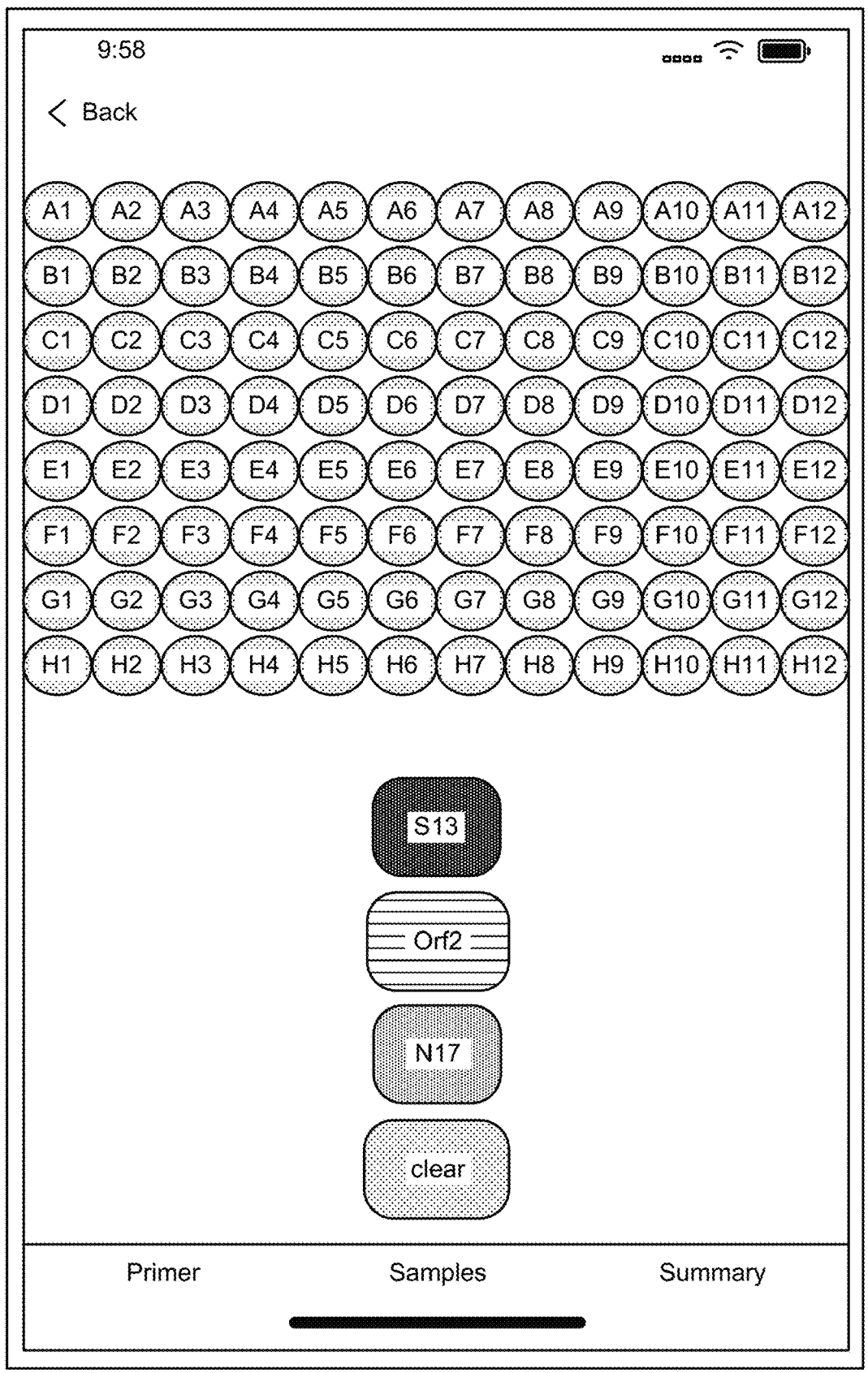
FIG. 9A shows a user interface at an external device configured to present a representation of a layout of the tray assembly supporting a plurality of reaction vessels.

FIG. 9A shows a user interface at an external device configured to present a representation of a layout of the tray assembly supporting a reaction vessel 115. The user interface may also enable an assignment of LAMP primers to sample wells at the tray assembly. For example, the user interface may be configured to allow a user to assign primer S13 to well F4. In another example, the user interface may be configured to allow a user to assign primer N17 to well C6.

The LAMP device 100 setup and operation may be controlled from a computing device, such as an iPhone or a laptop via a Wi-Fi connection. Additionally, the controller of the LAMP device 100 may be configured to receive instructions from the external computing device, such as an iPhone or a laptop via a Wi-Fi connection. A software program on the external computing device may be configured to control sample setup and visualize the LAMP device 100 results in real-time.

Figure 9B:
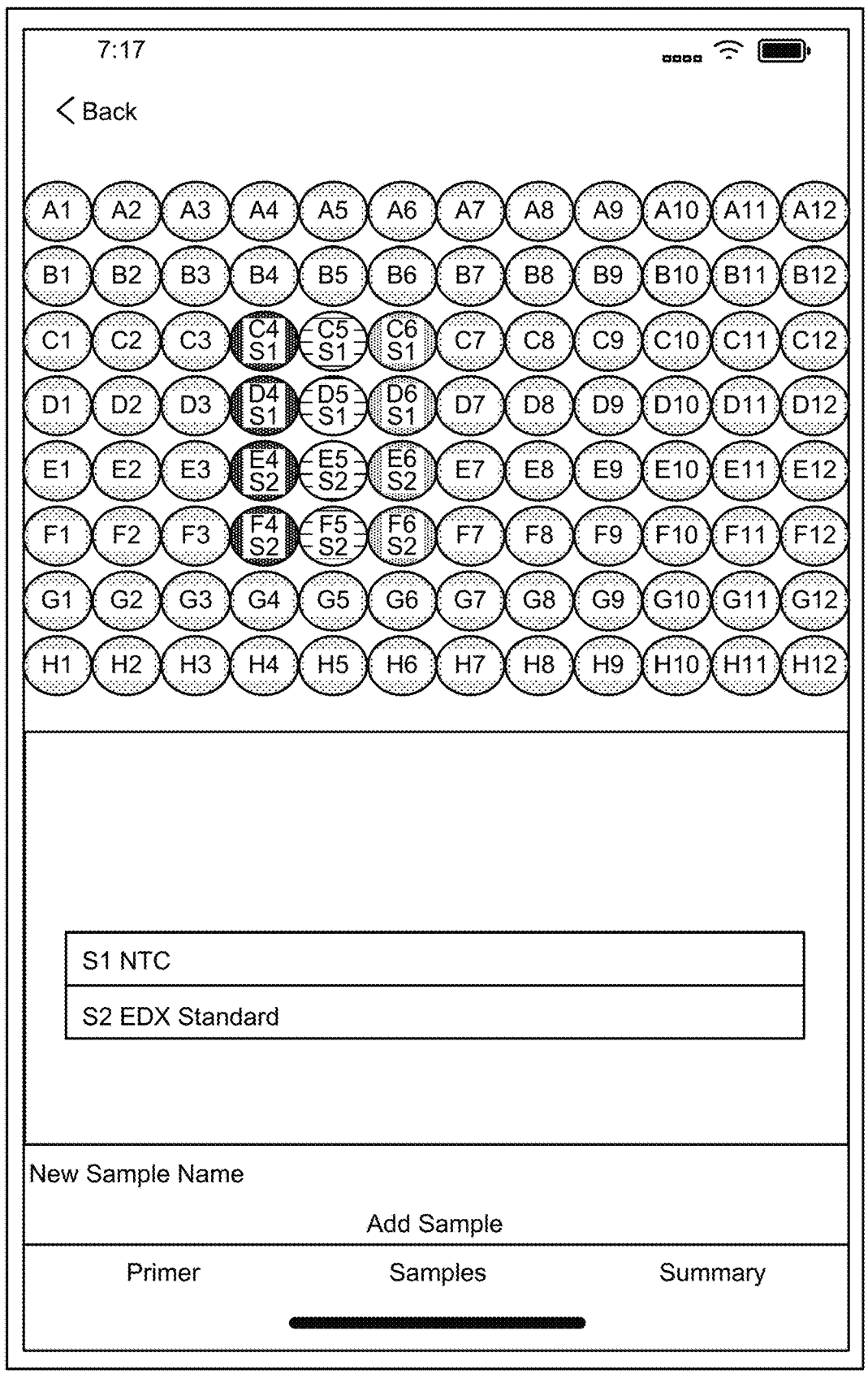
FIG. 9B shows a user interface at an external device configured to present a mapping of the reaction vessels at a tray assembly supporting a plurality of reaction vessels.

FIG. 9B shows a user interface at an external device configured to present a mapping of the reaction vessel at a tray assembly supporting a reaction vessel. Additionally, the user interface may be configured to allow a user to assign sample names to the reaction vessel 115 in the tray assembly.

Figure 9C:
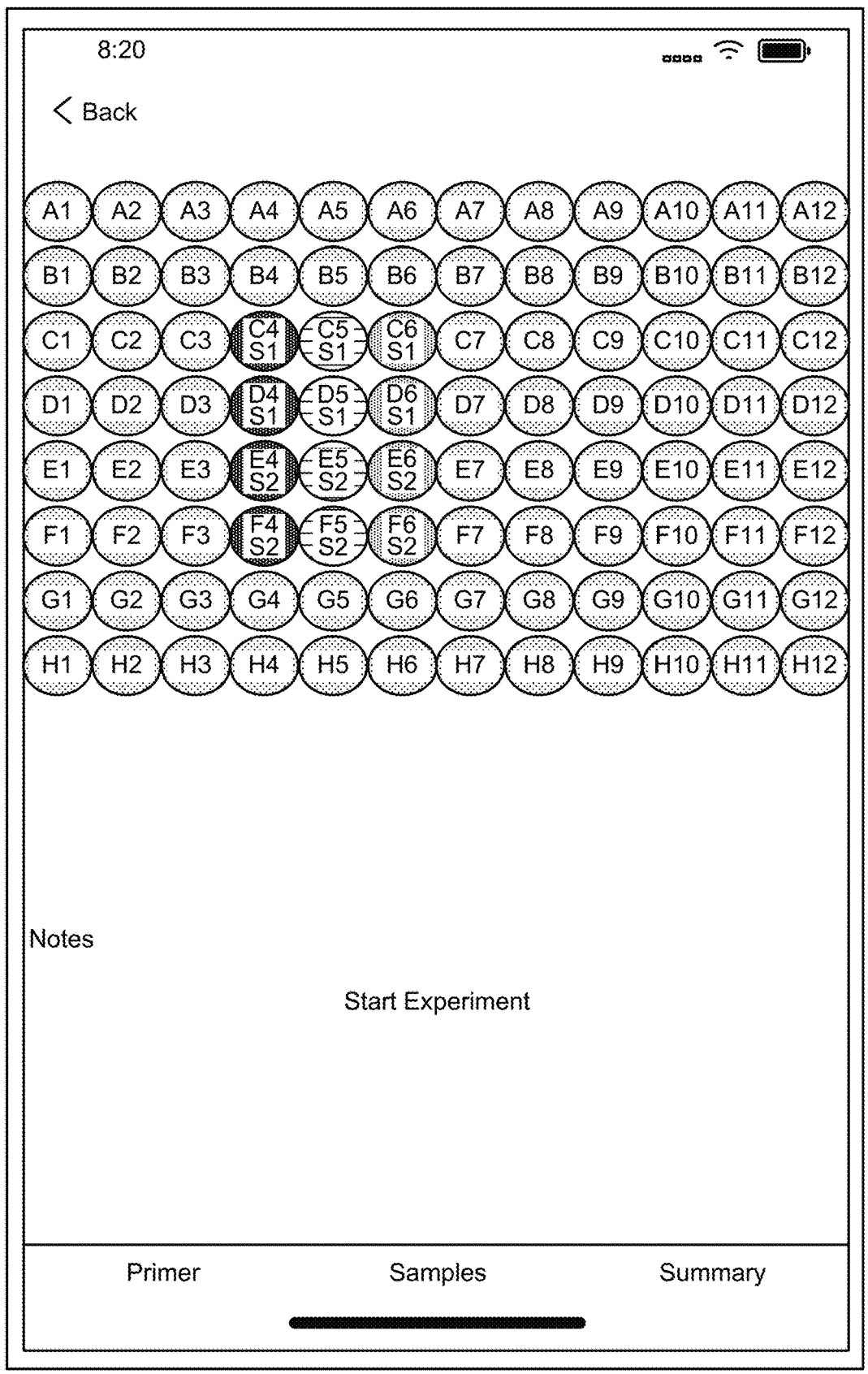
FIG. 9C shows a user interface at an external device configured to start a LAMP Reaction by receiving an input instructing the activation of the LAMP device.

FIG. 9C shows a user interface at an external device configured to start a LAMP Reaction by receiving an input instructing the activation of the LAMP device 100. The external device may communicate with the LAMP device 100 via a TCP/IP connection over WI-FI. In some embodiments, the LAMP device 100 may be an access point with a static IP address. The LAMP device 100 may be configured to include a TCP socket to receive and send data. Data between the LAMP device 100 and the external device may be exchanged as a JSON string that is decoded into objects on both sides of the connection. To parse data from the TCP stream, a custom header including length information may be used to about the kind of data and the length of the message encoded into 8 bytes.

Figure 9D:
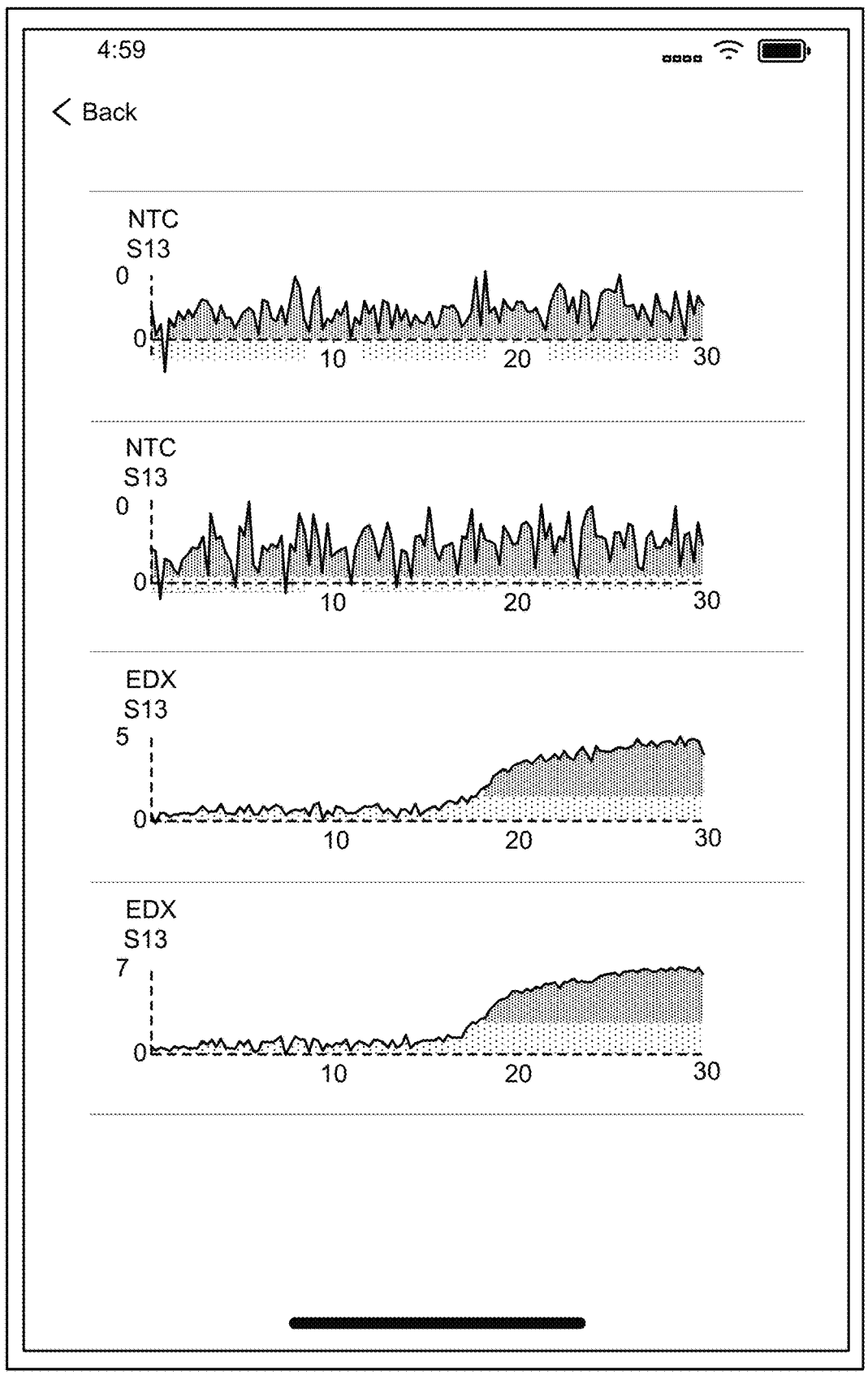
FIG. 9D shows a user interface at an external device configured to display the results of the LAMP reaction determining which reaction vessel included a reaction with a fluorescence signal.

FIG. 9D shows a user interface at an external device configured to display the results of the LAMP reaction determining which reaction vessel included a reaction with a fluorescence signal. The user interface may be configured to present a real-time data display of LAMP reactions.

Figure 10:
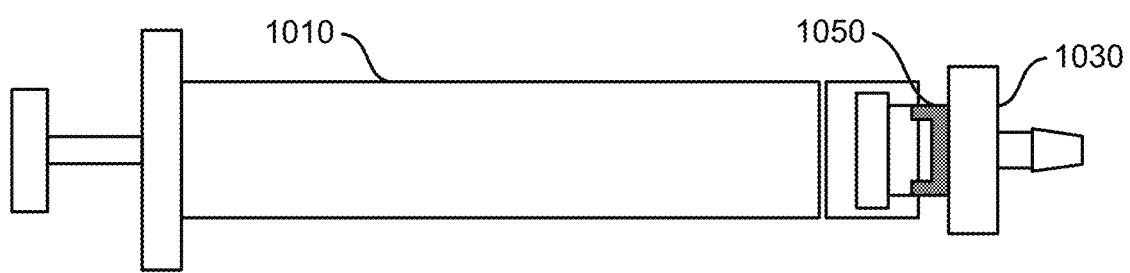
FIG. 10 shows an example of a syringe system for isolating the RNA from the saliva, the system including a syringe, an adapter, and a plurality of disks interposed between the syringe and the adapter.

FIG. 10 shows an example of a syringe 1010 system for isolating the RNA from the saliva, the system including a syringe 1010, an adapter 1030, and a plurality of disks interposed between the syringe 1010 and the adapter 1030. Detection of SARS-COV-2 from biological matrices may require the isolation of genomic RNA for amplification. The isolation of genomic RNA may enrich the nucleic acid and remove interfering compounds prior to amplification. Standard methods that employ silica columns may require expensive lab equipment, consumables, and trained personnel. Unlike standard methods, the syringe 1010-based system described herein does not require expensive lab equipment, consumable, and trained personnel.

Isolating or purifying the RNA from saliva samples may be performed using a syringe 1010 and a cellulose disks 1050 that include chemically modified paper substrate that binds RNA. In some embodiments, the cellulose disks 1050 may include 6-mm sized paper disks modified with 2,3-epoxypropyltrimethylammonium chloride (EPTMAC) to bind RNA. The cellulose disks 1050 may behave as a syringe filter and be stacked and placed into adapter 1030 t. The syringe 1010 may be attached to the adapter 1030 via Luer lock and may be configured to aspirate a guanidinium isothiocyanate buffered saliva sample. This process binds RNA to the EPTMAC substrate.

The syringe 1010 may be a 3-mL medical syringe. The adapter 1030 may be a straight female Luer-to-barbed hose polypropylene adapter. On the Luer lock side, cellulose disks 1050 of EPTMAC paper may be stacked onto each other. When the adapter 1030 is screwed onto the syringe 1010, the cellulose disks 1050 may be locked into place. The syringe 1010 may then be configured to displace the sample through the stack of cellulose disks 1050 upon aspirating the syringe 1010. EPTMAC-modified cellulose may be advantageous due to its persistent positive charge and its improved ability to bind RNA. In some embodiments, the cellulose disks 1050 of EPTMAC paper may be wetted with 1 μL water, stacked above each other, and inserted into the center cavity of the adapter 1030 as marked by the checkered patterning as shown in FIG. 10. The adapter 1030 may be configured to attach to a Luer lock syringe The sample may be prepared prior to aspiration through the syringe 1010. The saliva from the test subject (e.g., 0.5 mL) may be mixed with SDS-containing stabilization buffer, 1 mL L6-Buffer (5.25M guanidinium thiocyanate, 50 mM Tris, 20 mM EDTA, 1.3% TritonX-100) and ethanol is added to a total percentage of 35%. The sample may be passed twice through the adapter 1030 using a 3-mL syringe. The bound RNA is then washed and further purified by aspirating and dispensing of alcohol containing liquids. For example, two washes of bound RNA may be performed by passing 2 mL of 70% ethanol through the assembly. After detaching the syringe 1010 adapter 1030, the cellulose disks 1050 may be removed and placed onto a glass fiber filter to be dried out. For example, the cellulose disks 1050 may be placed onto Whatman Glass Microfiber filters (GF/C). In some embodiments, the dry cellulose disks 1050 may be washed in molecular biology grade water for 1 min and dried on glass fiber filter paper again. The molecular biologically grade water may include 4% bleach and Kimwipes may be added to the solution for 10 seconds. The cellulose disks 1050 may be directly introduced into the LAMP reaction mixture and analyzed without further elution or purification. Syringe 1010 may capture enough RNA to perform LAMP assays in duplicate and with up to 3 primer sets. This method may be able to detect 10.000 copies/mL of viral RNA.

The RNA purification method may be very sensitive and may detect COVID-19 RNA at very low copy numbers of sometimes a little as 200 copies per mL saliva. Typically, positive patients have millions of viral genome copies per mL saliva. Compared to the commercial silica columns, the syringe 1010 approach outperformed the silica columns at 2.000 copies/mL.

In some embodiments, EPTMAC-modified cellulose disks 1050 (as well as bleached Kimwipes) may be wetted with 1 uL PCR water. The cellulose disks 1050 may be stacked above each other within the syringe 1010. For example, the cellulose disks 1050 may include 6-8 disks per syringe. The stacked cellulose disks 1050 may be centrally added to the adapter 1030, which may be subsequently mounted to a 3 mL BD syringe.

In some embodiments, 1 mL of the L6 buffer may be created with 5.25M GuSCN, 50 mM Tris, 20 mM EDTA, and 1.3% TritonX-100. Additionally, 500 uL unknown saliva sample may be heated up for 15 min to 75 degrees Celsius in a 5 mL RNAse and DNAse free Eppendorf tube to make sure all viral particles are inactivated. Afterwards, 810 uL absolute ethanol may be added to each sample to reach a final concentration of 35%.

In some embodiments, a mastermix may be prepared. The mastermixes may include H2O 1.85 uL, LAMP Reaction Mix 10 uL, LAMP fluorescent dye 0.15 uL, and Primermix 2 uL per reaction. The mastermix may be prepared using the appropriate LAMP primers. 14 uL mastermix may be added to each vial and 6 uL PCR water (or Qiagen extract) may be added. For each reaction, one dried paper disk may be added directly into the reaction and LAMP may be run in replicates (2 paper disks per primer set).

In some embodiments, viral RNA may be extracted from saliva samples with a number of methods. Viral RNA extraction kits from Qiagen (e.g. QIAamp MinElute Virus Spin Kit) may be a standard method of extracting viral RNA. Additionally, RNA may be extracted on pieces of certain absorptive papers such as Kimwipes. In some embodiments, small rectangular pieces of a single ply of Kimwipe paper may be applied to a heat laminating plastic sleeve resembling a dip stick. These paper/plastic dip sticks may be used to capture viral RNA from a buffered saliva sample in 60 seconds. Then, the paper tip may be washed with ethanol, air dried, and dipped into the LAMP reaction mix of the PCR plate. This method may allow for fast adaptation of the saliva specimen to LAMP analysis. Overall, a human saliva sample may be processed in 5 minutes or fewer.

Figure 11:
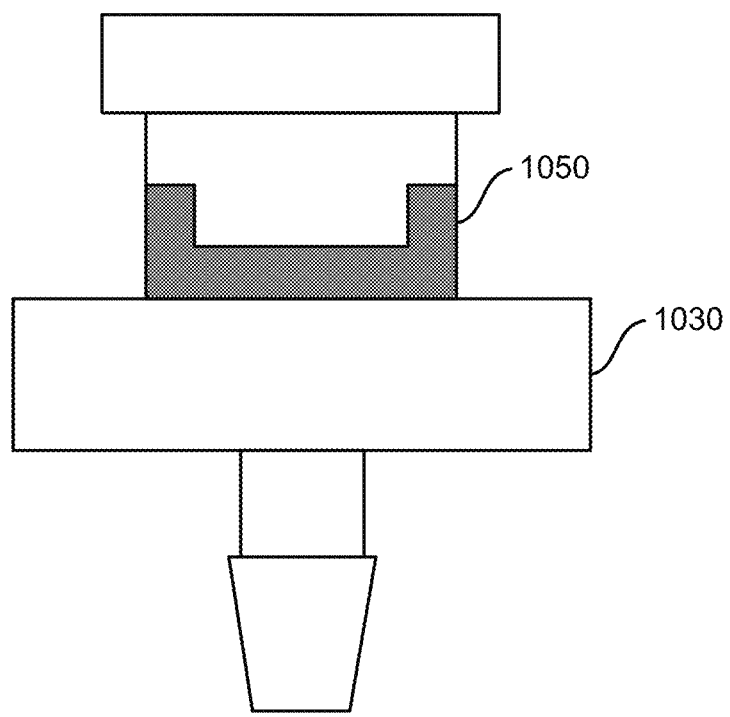
FIG. 11 shows an adapter configured to connect to the syringe in the syringe system.

FIG. 11 shows an adapter 1030 configured to connect to the syringe 1010 in the syringe 1010 system. In some embodiments, an adapter 1030 is placed in a 50 mL falcon tube and covered with 20% bleach. The tube may contain adapters and bleach shaken for 30 min on a vertical shaker at highest speed. Afterwards, the bleach may be discarded and the adapter 1030 may be covered with molecular biology grade water and shaken for an hour. The washing step may be repeated once. At last, water may be removed and the adapter 1030 may be dried on glass fiber filter paper (Whatman GF/F) until completely dry.

Figure 12:
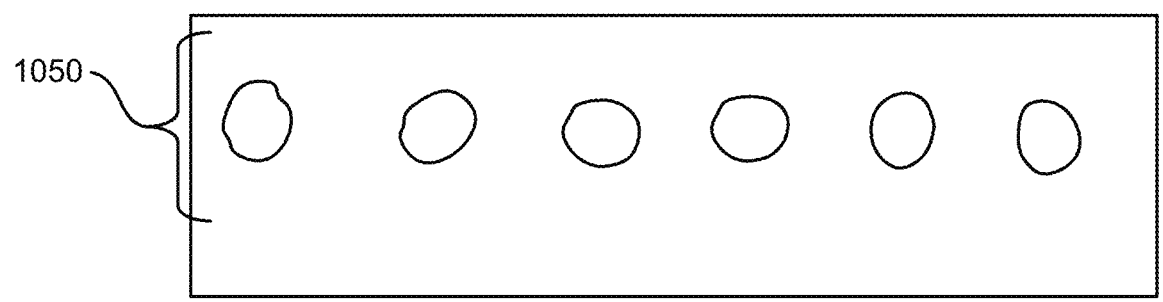
FIG. 12 shows a plurality of disks configured to be interposed between the syringe and the adapter.

FIG. 12 shows a plurality of cellulose disks 1050 configured to be interposed between the syringe 1010 and the adapter 1030. In some embodiments, the plurality of disks may include 6 mm circles of Kimwipes that were punched out using a hole puncher. In some embodiments, the plurality of disks may be activated in either a 1.8% or 18% aqueous NaOH solution for 10 min. The activated paper may be collected using a vacuum pump and suction filter and immersed in an EPTMAC aqueous solution, having a mass ratio of 2.8:1 of EPTMAC to paper, for 24 hat room temperature. The paper may be collected by vacuum filtration and neutralized with 1% acetic acid, 1.8% NaOH solution, or 10% acetic acid, or 18% NaOH solution. The final product may be washed three times with absolute ethanol and dried at room temperature.

Figure 13:
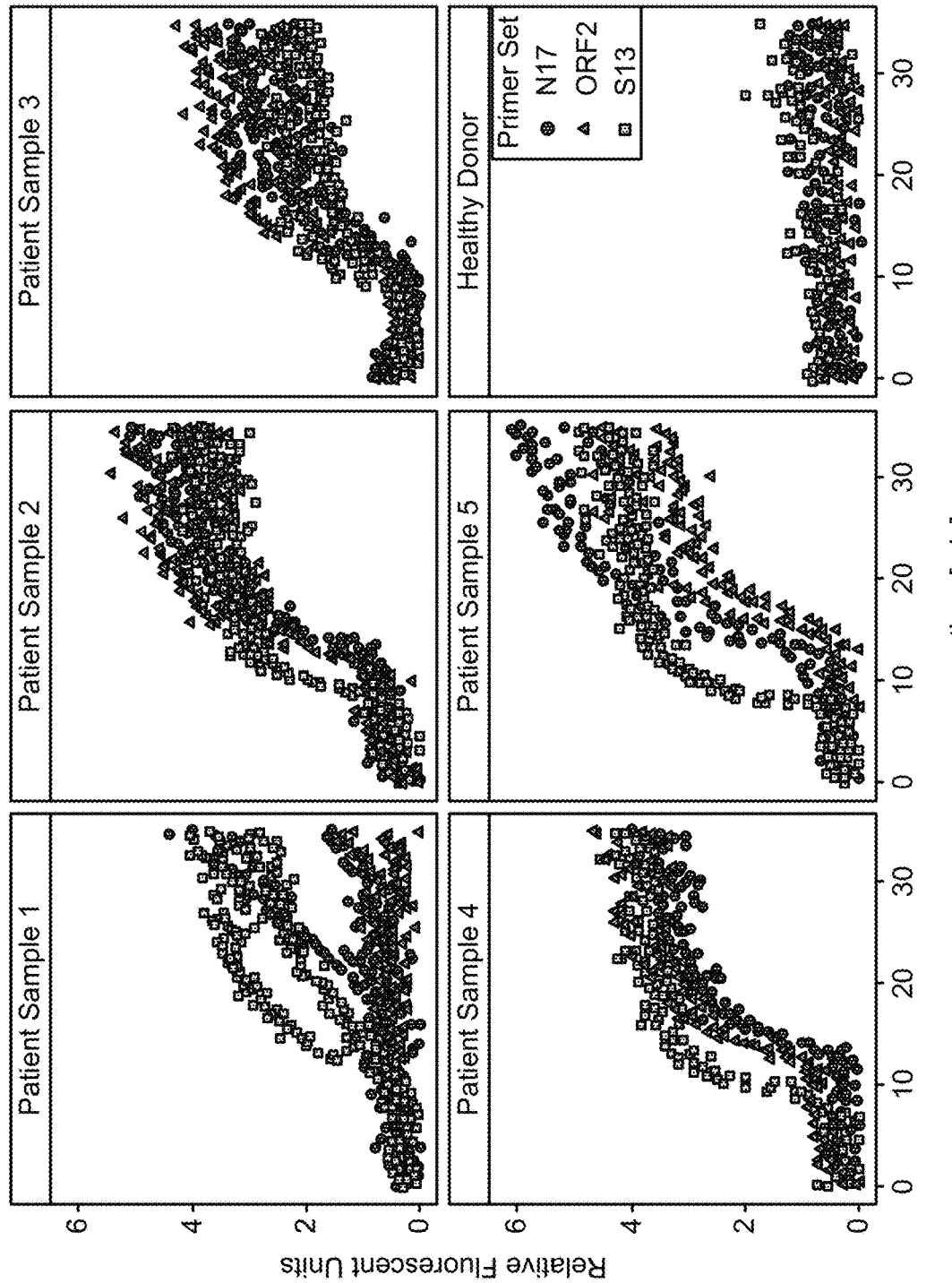
FIG. 13 shows an example of a comparison between a positive patient saliva sample and a negative sample based on the fluorescent signal.

FIG. 13 shows an example of a comparison between a positive patient saliva sample and a negative sample based on the fluorescent signal. As shown, samples 1-5 may demonstrate a fluorescent signal for a COVID-positive saliva sample based on the RNA extraction method as carried out by the LAMP device 100. Sample 6 may demonstrate a fluorescent signal for a COVID-negative saliva sample based on the RNA extraction method as carried out by the LAMP device 100.

Advantages for of the LAMP device 100 include minimal lab equipment, consumables, and trained personnel. For example, LAMP-based tests may require a 1-mL saliva specimen. Most people can produce this saliva specimen and no healthcare worker is required to be present. The LAMP device 100 may rapidly and reliably detect whether a persons' saliva contains the novel coronavirus. The portability of the LAMP device 100 capable of executing such tests could be implemented at airports or other transit hubs that are frequented by large numbers of people on a daily basis. Unlike standard methods, the LAMP device 100 is capable of rapidly and reliably detecting pathogenic material at a lower cost.

An individual to be tested can conduct sampling of a saliva sample using the disclosed device without the need for a healthcare worker. This reduces the risk of nosocomial spread of infections. The device is configured to quickly extract RNA from a saliva sample, which the device subsequently subjects to a LAMP assay with fluorescent detection of the resulting amplified DNA by an automated device. In a non-limiting embodiment, the device can process up to 96 sample reactions in less than 35 minutes.

Additional applications for the LAMP device 100 may include diagnosing cancer. The LAMP device 100 may provide diagnoses for cancer patients using saliva samples. Cancer patients are often immunosuppressed and, as such, are at high risk of contracting severe infectious diseases, including COVID-19. LAMP assays of saliva samples represent a fast, inexpensive, and reliable method to detect the novel coronavirus.

Figure 14:
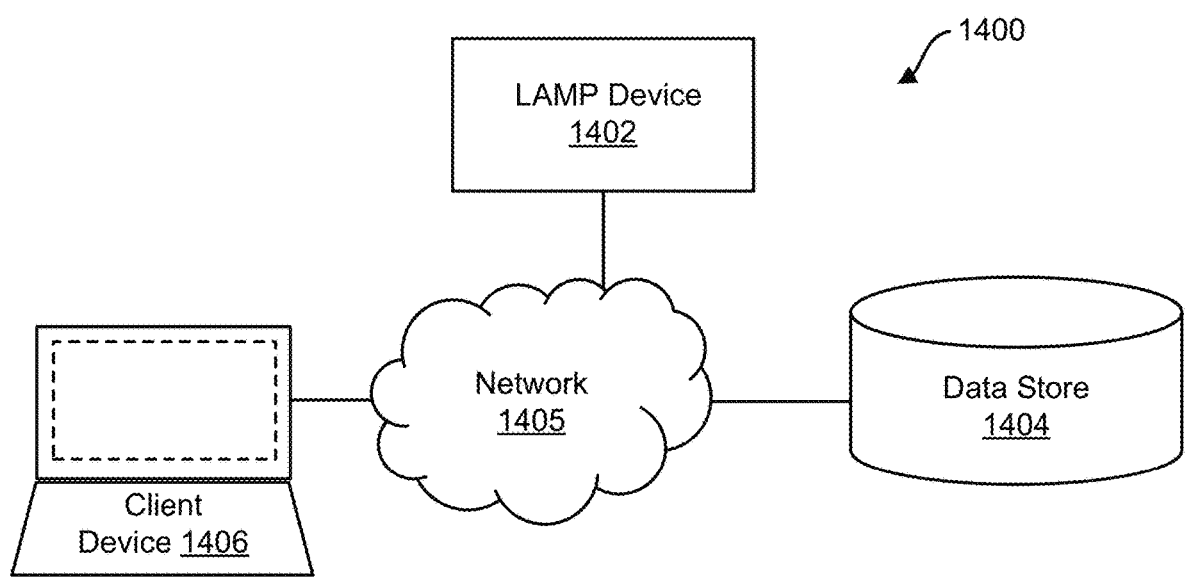
FIG. 14 depicts a system diagram illustrating an example of an LAMP system 1400, in accordance with some example embodiments.

FIG. 14 depicts a system diagram illustrating an example of an LAMP system 1400, in accordance with some example embodiments. Referring to FIG. 14, the LAMP system 1400 may include an LAMP device 1402, a data store 1404, and a client device 1406. As shown in FIG. 14, the LAMP device 1402, the data store 1404, and the client device 1406 may be communicatively coupled via a network 1405. The network 1405 may be a wired network and/or a wireless network including, for example, a local area network (LAN), a virtual local area network (VLAN), a wide area network (WAN), a public land mobile network (PLMN), the Internet, and/or the like.

Communication with a smartphone may be achieved by a TCP/IP connection over WI-FI. Therefore, the Raspberry Pi may be converted to an access point with a static IP address. The python script may include a TCP socket to receive and send data. Data may be exchanged as a JSON string that is decoded into objects on both sides of the connection. To parse data from the TCP stream, a custom header including length information may be used to about the kind of data and the length of the message encoded into 8 bytes.

Methods and systems of the present disclosure can be implemented by way of one or more algorithms. An algorithm may be implemented by way of software upon execution by the LAMP device 1402. The algorithm may analyze data from the data store 1404, which may be associated with binding affinities between molecules and immune cells. For example, the algorithm may obtain a fluorescence signal emitted from a reaction vessel. The algorithm may determine, based on the fluorescence signal, that a pathogenic material is present in the sample. The algorithm may extract green pixels from the image, determine the intensity values of the green pixels in the image, and determining, based on the intensity values of the green pixels in the image, that the pathogenic material is present in the sample.

Devices, systems, compositions, and methods of the present disclosure may be used for various applications, such as, for example, regulating a temperature of the tray assembly and instruct the imaging device to obtain the image for determining the quantity of the fluorescence in the sample. Additionally, a controller may be configured to determine the quantity of the fluorescence of the sample by reading green pixels from the image of the sample obtained by the imaging device. Further, the controller may generate an instruction to the light emitters to illuminate thereby illuminating the reaction vessel. Further, the controller may measure a fluorescence signal from the reaction vessel. Additionally, the controller may determine, based on the fluorescence signal, that a pathogenic material is present in the sample.

Figure 15:
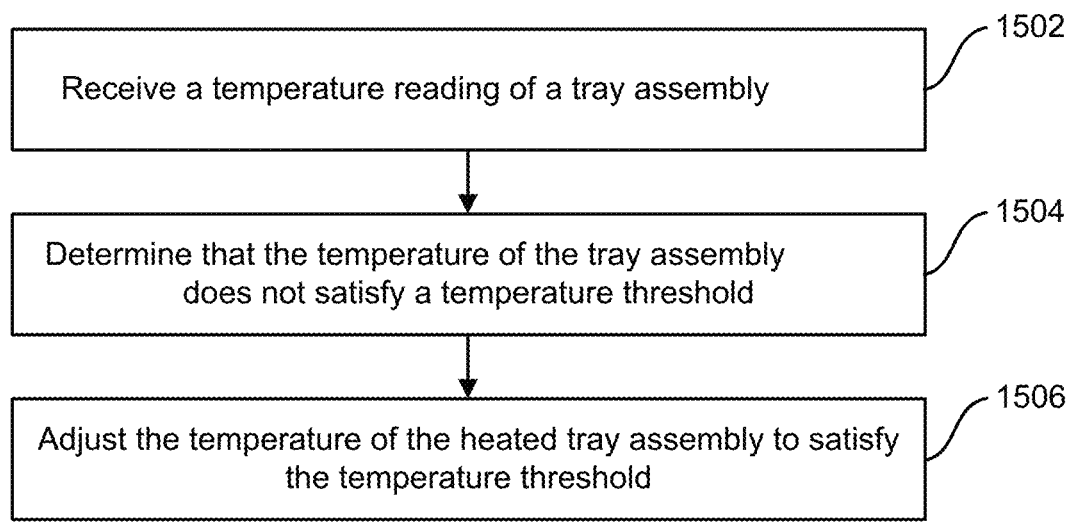
FIG. 15 depicts a flowchart illustrating an example of a process for adjusting the temperature of the heated tray assembly, in accordance with some example embodiments.

FIG. 15 depicts a flowchart illustrating an example of a process for adjusting the temperature of the heated tray assembly, in accordance with some example embodiments.

At 1502, the LAMP device 1402 may receive a temperature reading of a tray assembly. For example, a temperature of the tray assembly may be measured as 59° C.

At 1504, the LAMP device 1402 may determine, that the temperature of the tray assembly does not satisfy a temperature threshold based on a temperature reading of the tray assembly. For example, the controller detects a assay or reaction vessel temperature 59° C., which is lower than the predetermined temperature of 65° C.

At 1506, the LAMP device 1402 may adjusting, in response to the tray assembly not satisfying the temperature threshold, the temperature of the tray assembly to satisfy the temperature threshold. For example, the controller may be configured to switch on and heat the tray assembly to 65° C.

Figure 16:
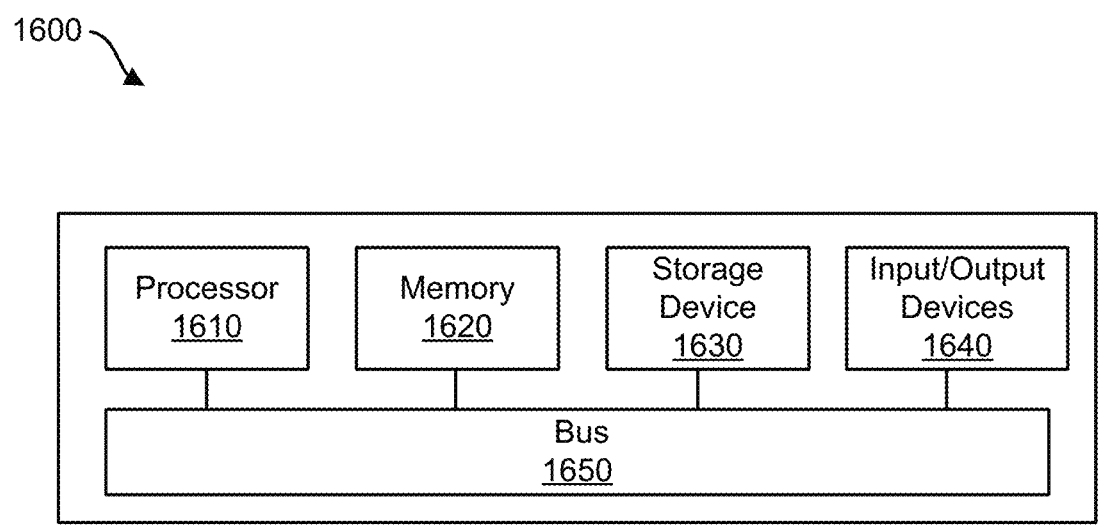
FIG. 16 depicts a block diagram illustrating a computing system, in accordance with some example embodiments.

Referring now to FIG. 16, illustrated is a block diagram illustrating an example of a computing system 1600 consistent with implementations of the current subject matter. Referring to FIGS. 1-16, the computing system 1600 may be used to implement the LAMP device and/or any component therein. For example, the computing system 1600 may implement user equipment, a personal computer, or a mobile device.

As shown in FIG. 16, the computing system 1600 may include a processor 1610, a memory 1620, a storage device 1630, and an input/output device 1640. The processor 1610, the memory 1620, the storage device 1630, and the input/output device 1640 may be interconnected via a system bus 1650. The processor 1610 is capable of processing instructions for execution within the computing system 1600. Such executed instructions may implement one or more components of, for example, the LAMP device. In some example embodiments, the processor 1610 may be a single-threaded processor. Alternately, the processor 1610 may be a multi-threaded processor. The processor 1610 is capable of processing instructions stored in the memory 1620 and/or on the storage device 1630 to display graphical information for a user interface provided via the input/output device 1640.

The memory 1620 is a non-transitory computer-readable medium that stores information within the computing system 1600. The memory 1620 may store data structures representing configuration object databases, for example. The storage device 1630 is capable of providing persistent storage for the computing system 1600. The storage device 1630 may be a floppy disk device, a hard disk device, an optical disk device, or a tape device, or other suitable persistent storage means. The input/output device 1640 provides input/output operations for the computing system 1600. In some example embodiments, the input/output device 1640 includes a keyboard and/or pointing device. In various implementations, the input/output device 1640 includes a display unit for displaying graphical user interfaces.

According to some example embodiments, the input/output device 1640 may provide input/output operations for a network device. For example, the input/output device 1640 may include Ethernet ports or other networking ports to communicate with one or more wired and/or wireless networks (e.g., a local area network (LAN), a wide area network (WAN), the Internet, a public land mobile network (PLMN), and/or the like).

In some example embodiments, the computing system 1600 may be used to execute various interactive computer software applications that may be used for organization, analysis and/or storage of data in various formats. Alternatively, the computing system 1600 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing items and/or functionalities. Upon activation within the applications, the functionalities may be used to generate the user interface provided via the input/output device 1640. The user interface may be generated and presented to a user by the computing system 1600 (e.g., on a computer screen monitor, etc.).

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

Numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

In the detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

The invention claimed is:

1. A device configured to conduct loop-mediated isothermal amplification, the device comprising:
    an enclosure having outer walls configured to define an internal space, the enclosure configured to isolate the internal space from light outside the enclosure;
    a tray assembly situated within the internal space, the tray assembly configured to support a reaction vessel configured for holding a sample for amplification, wherein the tray assembly includes a center plate interposed between a plurality of mica plates and wherein the plurality of mica plates have brass connector lip for a slide-on power connector and wherein the center plate is a copper plate;
    a plurality of light emitters situated inside the enclosure, the plurality of light emitters configured to illuminate the reaction vessel for exciting a fluorescence of the sample in the reaction vessel;
    an imaging device situated in the internal space and configured to obtain an image of the sample for determining a quantity of the fluorescence in the sample; and
    a controller communicatively coupled to the tray assembly, the plurality of light emitters, and the imaging device, the controller configured to regulate a temperature of the tray assembly and instruct the imaging device to obtain the image for determining the quantity of the fluorescence in the sample.

2. The device of claim 1, wherein the tray assembly includes a tapered hole configured to hold the reaction vessel and wherein the reaction vessel is positioned within the tapered hole.

3. The device of claim 1, wherein the reaction vessel protrudes at least partially downward from the tray assembly and wherein the plurality of light emitters is positioned below the tray assembly oriented towards the reaction vessel.

4. The device of claim 1, wherein the controller is configured to determine the quantity of the fluorescence of the sample by reading green pixels from the image of the sample obtained by the imaging device.

5. The device of claim 1, wherein the imaging device is positioned below the tray assembly and oriented towards the reaction vessel, and wherein the imaging device includes a long pass filter and a Bayer filter.

6. The device of claim 5, wherein the imaging device is a CCD camera configured to obtain the image near a bottom region of the tray assembly and wherein the imaging device is configured to capture an intensity of green light channels via the long pass filter and the Bayer filter.

7. The device of claim 1, wherein the controller is configured to perform operations comprising:
determining, based on a temperature reading of the tray assembly, that the temperature of the tray assembly does not satisfy a temperature threshold; and
adjusting, in response to the tray assembly not satisfying the temperature threshold, the temperature of the tray assembly to satisfy the temperature threshold.

8. The device of claim 1, wherein the reaction vessel is at least one of a plate, a tube, and a strip, and wherein the plurality of light emitters includes at least one blue light LED.

9. The device of claim 1, wherein the plurality of mica plates includes a set of outermost mica plates relative to the center plate and a set of innermost mica plates relative to the center plate, and wherein the set of outermost mica plates have a width larger than the set of innermost mica plates.

10. The device of claim 1, further comprising a heater lid above the tray assembly and inside the enclosure, the heater lid configured to regulate the temperature at the tray assembly.

11. The device of claim 1, wherein at least a first light emitter of the plurality of light emitters is positioned near a first side of the tray assembly and a second light emitter of the plurality of light emitters is positioned near a second side of the tray assembly.

12. The device of claim 1, wherein the controller is further configured to perform operations comprising:
generate an instruction to the light emitters to illuminate thereby illuminating the reaction vessel; and
measure a fluorescence signal from the reaction vessel.

13. The device of claim 1, wherein the controller is further configured to perform operations comprising:
measure a fluorescence signal of the sample inside the reaction vessel; and
determine, based on the fluorescence signal, that a pathogenic material is present in the sample.

* * * * *